US010839309B2

(12) United States Patent
Kokkinis et al.

(10) Patent No.: US 10,839,309 B2
(45) Date of Patent: Nov. 17, 2020

(54) DATA TRAINING IN MULTI-SENSOR SETUPS

(71) Applicant: ACCUSONUS, INC., Lexington, MA (US)

(72) Inventors: Elias Kokkinis, Patras (GR); Alexandros Tsilfidis, Athens (GR); Michael Tzannes, Lexington, MA (US)

(73) Assignee: ACCUSONUS, INC., Lexington, MA (US)

( * ) Notice: Subject to any disclaimer, the term of this patent is extended or adjusted under 35 U.S.C. 154(b) by 1160 days.

(21) Appl. No.: 15/174,539

(22) Filed: Jun. 6, 2016

(65) Prior Publication Data

US 2016/0358107 A1 Dec. 8, 2016

Related U.S. Application Data

(60) Provisional application No. 62/170,793, filed on Jun. 4, 2015.

(51) Int. Cl.
G06N 20/00 (2019.01)
G10L 21/028 (2013.01)

(52) U.S. Cl.
CPC ............ G06N 20/00 (2019.01); G10L 21/028 (2013.01)

(58) Field of Classification Search
CPC .............................. G06N 20/00; G10L 21/028
See application file for complete search history.

(56) References Cited

U.S. PATENT DOCUMENTS

| 8,015,003 | B2 | 9/2011 | Wilson et al. | |
| 9,008,329 | B1* | 4/2015 | Mandel | G10K 15/00 381/71.1 |
| 9,668,066 | B1* | 5/2017 | Betts | H04R 25/40 |
| 2007/0154033 | A1* | 7/2007 | Attias | H04R 3/005 381/94.1 |
| 2011/0191102 | A1* | 8/2011 | Espy-Wilson | G10L 21/0272 704/207 |
| 2013/0132077 | A1* | 5/2013 | Mysore | G10L 21/028 704/233 |
| 2013/0132085 | A1* | 5/2013 | Mysore | G10L 15/144 704/256.1 |
| 2013/0226558 | A1* | 8/2013 | Mysore | G10L 21/028 704/9 |

(Continued)

FOREIGN PATENT DOCUMENTS

WO WO-2013030134 A1 * 3/2013 ......... G10L 21/0208

OTHER PUBLICATIONS

Dhanalakshmi, P., S. Palanivel, and Vennila Ramalingam. "Classification of audio signals using SVM and RBFNN." Expert systems with applications 36, No. 3 (2009): 6069-6075. (Year: 2009).*

(Continued)

Primary Examiner — Vincent Gonzales
Assistant Examiner — Casey R. Garner
(74) Attorney, Agent, or Firm — Jason H. Vick; Sheridan Ross, PC

(57) ABSTRACT

A system and method for constructing training dictionaries with multichannel information. An exemplary method takes into account the effect of the acoustic path while training multichannel acoustic data. A method that uses different time-frequency resolutions in machine learning training is also presented.

24 Claims, 16 Drawing Sheets

(56) References Cited

U.S. PATENT DOCUMENTS

2014/0079248 A1* 3/2014 Short ................ G10L 21/0272
                                                           381/119

OTHER PUBLICATIONS

Cichocki, Andrzej et al. "Nonnegative Matrix and Tensor Factorizations: Applications to Exploratory Multi-Way Data Analysis and Blind Source Separation" Chapter, 1, Sections 1.4.3 and 1.5; John Wiley & Sons, 2009.

Grais, Emad M. et al. "Single Channel Speech Music Separation Using Nonnegative Matrix Factorization and Spectral Masks" 2011 17th International Conference on Digital Signal Processing (DSP); Jul. 6-8, 2011.

Schmidt, Mikkel et al. "Single-Channel Speech Separation Using Sparse Non-Negative Matrix Factorization" Informatics and Mathematical Modelling, Technical University of Denmark, Proceedings of Interspeech, pp. 2614-2617 (2006).

* cited by examiner

DATA TRAINING IN MULTI-SENSOR SETUPS

RELATED APPLICATION

This application claims the benefit of and priority under 35 U.S.C. § 119(e) to U.S. Patent Application No. 62/170,793 filed Jun. 4, 2015, entitled "Data Training in Multi-Sensor Setups," which is incorporated herein by reference in its entirety.

TECHNICAL FIELD

Various embodiments of the present application relate to training methods for supervised or semi-supervised machine learning applications. Aspects also relate to improving all fields of signal processing including but not limited to speech, audio and image processing, radar processing, biomedical signal processing, medical imaging, communications, multimedia processing, forensics, machine learning, data mining, etc.

BACKGROUND

Machine learning is important in the signal processing field. There are many tasks that can be performed by machine learning methods such as classification, regression, clustering, dimensionality reduction, etc. In the case of supervised or semi-supervised learning methods, a complete or incomplete training dictionary is required. Supervised and semi-supervised approaches take advantage of training information (often in the form of training dictionaries) to improve performance, accelerate convergence or ensure convergence in the iterative algorithms that are often used in machine learning applications. Often these applications involve seeking solutions using iterative algorithms where a signal global optimum solutions do not exist and instead a number of saddle point solutions (or local optima) can be found during the iterative process. Supervised and semi-supervised approaches introduce information based on training data into the iterative algorithm, often in the form of initial states or initial conditions, in order to cause the algorithm to converge to a desirable choice of saddle point or to a desirable local optimum. Given that for many real-life applications training data are indeed available, there's an opportunity for new methods and systems to produce intelligent training dictionaries that can then be used to at least improve the performance, efficiency and operation of machine learning algorithms.

In accordance with one exemplary embodiment, a method is presented that enable the generation of such training dictionaries, in particular for source separation techniques that use non-negative matrix factorization (NMF) approaches. The performance of NMF methods depends on the application field and also on the specific details of the problem under examination. In principle, NMF is a signal decomposition approach and it attempts to approximate a non-negative matrix V as a product of two non-negative matrices W (the matrix of bases) and H (the matrix of activation functions). To achieve the approximation, a distance or error function between V and WH is constructed and minimized. In a most general case, the matrices W and H are randomly initialized. However, in order to improve performance and ensure convergence to a meaningful, desirable or useful factorization (the desirable "saddle point" or local optimum), the use of a training step and training data can be employed. Such methods that include a training step are referred to as supervised or semi-supervised NMF.

During the last decades both (i) the available computation that can be allocated to signal processing applications, and (ii) the number of available sensors that gather data, continuously increase. Thus, more information is readily available as is the processing power to take advantage of it. However, many traditional signal processing techniques are designed and contemplated only for single sensor signals. The availability and use of multi-sensor information can significantly improve the performance of signal processing tasks. Therefore, there's a need for new signal-processing methods and systems that explore multi-sensor information.

Live music events and studio recordings are examples where signal processing is usually performed on single microphone signals, despite the fact that inputs from many microphones are simultaneously available. In a typical live music event, dozens or even hundreds of signal inputs might be simultaneously available. Despite the fact that all these sound inputs are gathered and processed at a single location (for example at the main mixer), there are no inherent multichannel signal processing methods available to sound engineers. In addition, there are other cases where multi-microphone inputs are available simultaneously, including but not limited to recording studios, hearing assistive and hearing aid devices, mobile phones, active ear protection systems, public address systems, teleconference and conference systems, hands-free devices, automatic speech recognition systems, multimedia software and systems, systems for professional audio, DECT phones, desktop or laptop computers, tablets, etc.

Therefore, there is a need for new and improved signal processing methods and systems that take into account the multichannel information in multi-microphone setups and in general, in multi-sensor environments, where a sensor may be any passive or active device (or combination thereof) that is used for capturing, reading, measuring and/or detecting one or more signals (including audio signals, speech signals, images, videos, communications signals such as wireless, radio waves, optical signals and/or the like.)

A typical trade-off for most signal processing methods is the choice of the time-frequency resolution. According to Heisenberg's uncertainty principle, a signal cannot be sharply localized simultaneously in time and in frequency. In a more general form, the uncertainty principle asserts a fundamental limit to the precision with which certain pairs of physical properties, known as complementary variables, can be known simultaneously. This limitation can be important during the training phase of machine learning algorithms where both complementary variables (for example, time and frequency signal data) are important and must be accurately captured. Hence, there is a need for methods and systems that deal with the uncertainty principle during the training phase of machine learning methods, by allowing multiple time-frequency representations to be considered simultaneously.

In the art, while the use training data to assist in the convergence of iterative algorithms has been discussed, the capture and use of useful multi-sensor information is not taken into account in training machine learning algorithms. Neither is the simultaneous use of training signals that represent multiple time-frequency resolutions. For example, U.S. Pat. No. 8,015,003 B2, to Wilson et al. (which is incorporated herein by reference in its entirety) presents a method for "Denoising acoustic signals using constrained non-negative matrix factorization". In this patent, the training signals are "representative of the type of signals to be denoised" and both noise and speech are represented from corresponding training dictionaries.

However, multi-sensor information is not taken into account nor are any precautions for the uncertainty limitations, and no description of training signals for multi-sensor environments is provided. In "Single channel speech music separation using nonnegative matrix factorization and spectral masks," 7th International Conference on Digital Signal Processing (doi: 10.1109/ICDSP.2011.6004924) (which is incorporated herein by reference in its entirety), Grais and Erdogan use NMF for separating speech from music. To facilitate training, they use copies of speech utterances from the test speaker and recordings of piano pieces from the same artist. Again the authors make no explicit use of multi-sensor information and provide no solution for dealing with the challenges posed by the uncertainty principle (for example time-frequency limitations).

In "Single-channel speech separation using sparse non-negative matrix factorization" (Interspeech 2006) (which is incorporated herein by reference in its entirety), Schmidt and Olsson use two ways to learn speech dictionaries: (a) by using a large training data set of a single speaker, or (b) by segmenting the training data according to phoneme labels.

Again, no multi-sensor information is used and no effort for reducing the limitations of time frequency uncertainty is made. As can be seen from these and other related work, the primary purpose for using training signals in NMF is to provide at least starting points for the matrices that are used in the decomposition (the W or H matrices described above) so as to accelerate or improve convergence to an iterative solution. Typically, training is accomplished either by using a dataset of signals having common characteristics with the "desired" signal or by using a version of the "desired" signal itself. Expanding training dictionaries to include the use of multi sensor information as well as to cope with the time-frequency analysis limitations in machine learning training and more specifically in NMF training is a primary goal of the methods and systems disclosed in this invention.

As discussed above, training signals can take the form of prerecorded audio or speech signals in audio applications. They can also be previously captured (or captured during a training phase—where certain signals are intentionally not present, for example) signals or subsets of signals, where the signals are images, video or wireline or wireless communications signals.

In general, these is a need for creating intelligent training dictionaries that enable the rapid and useful convergence of iterative machine learning techniques. An exemplary embodiment presents new methods to improve training dictionaries by taking into account multi-sensor and multi-resolution information that is available in many applications.

These training signals or dictionaries can then be subsequently used as starting points in subsequent machine learning iterative algorithms to improve them. During this phase, the data being analyzed is no longer training data and the purpose of the machine learning algorithm is to analyze the non-training data via separation, classification, regression, clustering, dimensionality reduction, etc. Non-training data is any data that is not controlled or known in advance or determinable. As an example, in musical performances, instrument sound check is controlled and the existence of a solo in a recording is known in advance (or can be determined by detecting it during listening). The data or signals recorded during these times can be classified as training data or signals. Any other data or signals captured during a musical performance are non-training signals. These are the data or signals upon which methods involving separation, classification, regression, clustering, dimensionality reduction, etc., are performed using the training dictionaries determined with the training data or signals.

SUMMARY

Aspects relate to a method that uses multichannel information while training machine learning methods.

Aspects also relate to a method that improves a training dictionary in multi-sensor scenarios.

Aspects also relate to a method that takes into account the effect of the acoustic path while training multichannel acoustic data.

Aspects also relate to methods that cope with time-frequency limitations for training machine learning algorithms.

BRIEF DESCRIPTION OF THE DRAWINGS

For a more complete understanding of the invention, reference is made to the following description and accompanying drawings, in which.

DETAILED DESCRIPTION

Hereinafter, embodiments will be described in detail in accordance with the references to the accompanying drawings. It is understood that other embodiments may be utilized and structural changes may be made without departing from the scope of the present disclosure.

The exemplary systems and methods will sometimes be described in relation to audio systems. However, to avoid unnecessarily obscuring the present invention, the following description omits well-known structures and devices that may be shown in block diagram form or otherwise summarized.

For purposes of explanation, numerous details are set forth in order to provide a thorough understanding of the technology. It should be appreciated however that techniques herein may be practiced in a variety of ways beyond the specific details set forth herein. The terms determine, calculate and compute, and variations thereof, as used herein are used interchangeably and include any type of methodology, process, mathematical operation or technique.

Capturing Training Data from Multiple sensors: In the next paragraphs, exemplary scenarios are described in which multi-sensor data is available and methods for capturing such data so that it can be used to produce intelligent training dictionaries. Note that in general, a training dictionary captures inherent characteristics of the source data (for example spectral characteristics). Therefore, a training dictionary can be more useful when multi sensor characteristics of data are captured.

Figure 1:
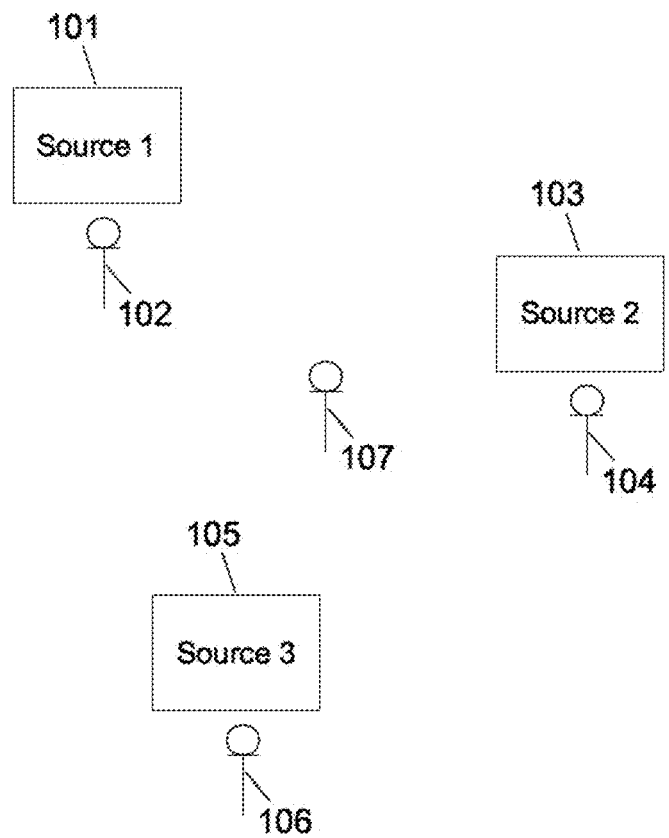
FIG. 1 illustrates an exemplary schematic representation of a multi-microphone setup.

FIG. 1 shows an exemplary embodiment of a multi-microphone setup where 4 microphones 102, 104, 106, 107 acquire the sound of 3 sources 101, 103 and 105. Three out of four microphones (102, 104 and 106) are meant to mainly capture the sound of individual sources (101, 103 and 105 respectively) and these can be typically called close-microphones. On the other hand, microphone 107 which can be referred to as an ambient microphone is not meant to capture a specific sound source, but rather the complete soundscape. In some embodiments, a close microphone can be an electromagnetic microphone or any type of microphone with lower sensitivity, while an ambient microphone can be a condenser microphone or any type of microphone with higher sensitivity. Despite their intended usage, all microphones capture not only the sound of their source of interest but also to some extent the sound of all (or some) of the other sources. This phenomenon is called microphone leakage (or microphone bleed or microphone spill) and is prominent in every real-life multi microphone setup. However, the captured sound of each source is not the same in each microphone due to the different signal paths. Here, the term signal path can refer to the acoustic path, i.e., the path the sound followed between the source location and the microphone at which the acoustic signal is captured. The effect of the acoustic path is to cause the source signal to change from the moment it is produced at the source location until it is captured by the microphone. Such changes include but are not limited to the attenuation from the source-microphone distance and the transfer medium, the effect of individual reflections, the room reverberation, etc. There is a unique acoustic path between a given sound source location and a given sensor position.

The previous description of a signal path can be extended to communications paths as well, where the communications path is that between the communications source and the communications receiver. The communications path takes into account the communications channel, channel noise (thermal or other) and interference from other communications sources, and the effects of signal fading that may occur because of multipath reflections. In other embodiments, the signal path refers to any transformation and/or processing that occurs in the source signal after being produced and before being captured by a sensor. The signal path can imply convolution and/or addition or any other transformation.

Figure 2:
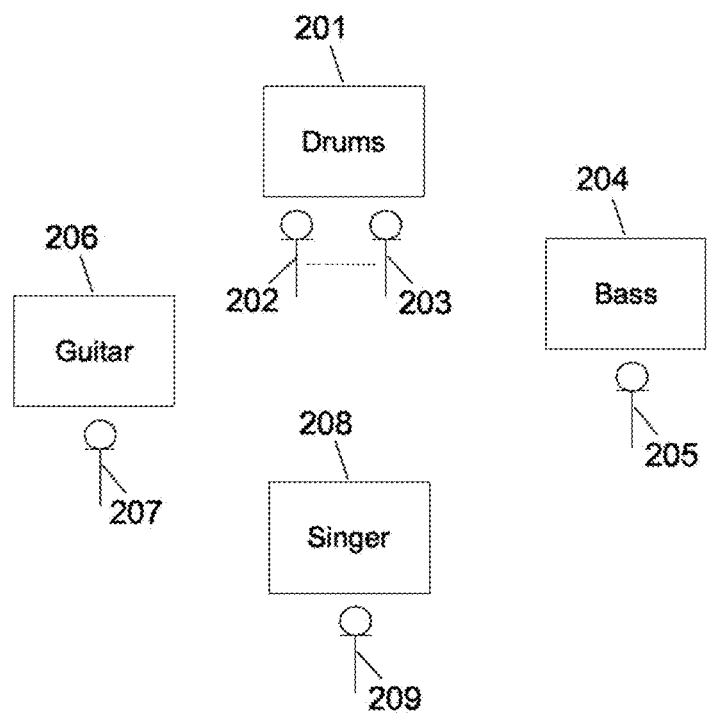
FIG. 2 illustrates an exemplary schematic representation of a multi-microphone and instrument setup for a music event.

FIG. 2 shows an example of a multi-microphone setup for an exemplary live or studio music event. A number of microphones 202, 203 are used to record a drum set 201 and microphones 205, 207 and 209 are used to record a bass 204, a guitar 206 and a singer 208, respectively. As previously discussed, all microphones capture all sound sources due to the microphone leakage phenomenon. Since the acoustic paths from each source to each microphone are not the same, the captured sound of each sound source will be different in each microphone. For example, the sound of the guitar 206 will be typically captured more clearly by the close microphone 207 where the effect of the acoustic path is small or even negligible. On the other hand, all other microphones 202, 203, 205 and 209 also capture the guitar sound. However, these other microphones capture somewhat different versions of the guitar source due to the different acoustic paths. From a sound engineering perspective, all these different versions of a captured sound can be useful and can be involved in the final sound mix or arrangement. Therefore, the unique characteristics of each one of the infinite acoustic paths can be important from the sound engineering perspective and this is why a sound engineer may sometimes place multiple microphones just to capture the same source.

In the art, in order to perform training or provide a reference of an algorithm that would process, for example, the guitar source 206 one could use: (a) representative recordings from any similar guitar, (b) recordings of the actual guitar 206 captured from a random microphone, (c) recordings of the actual guitar 206 and a dedicated microphone (this would typically be the close microphone 207). As described above, a new form of training is described that utilizes sound captured across a multiple of the setup microphones 202, 203, 205, 207, 209.

Figure 3:
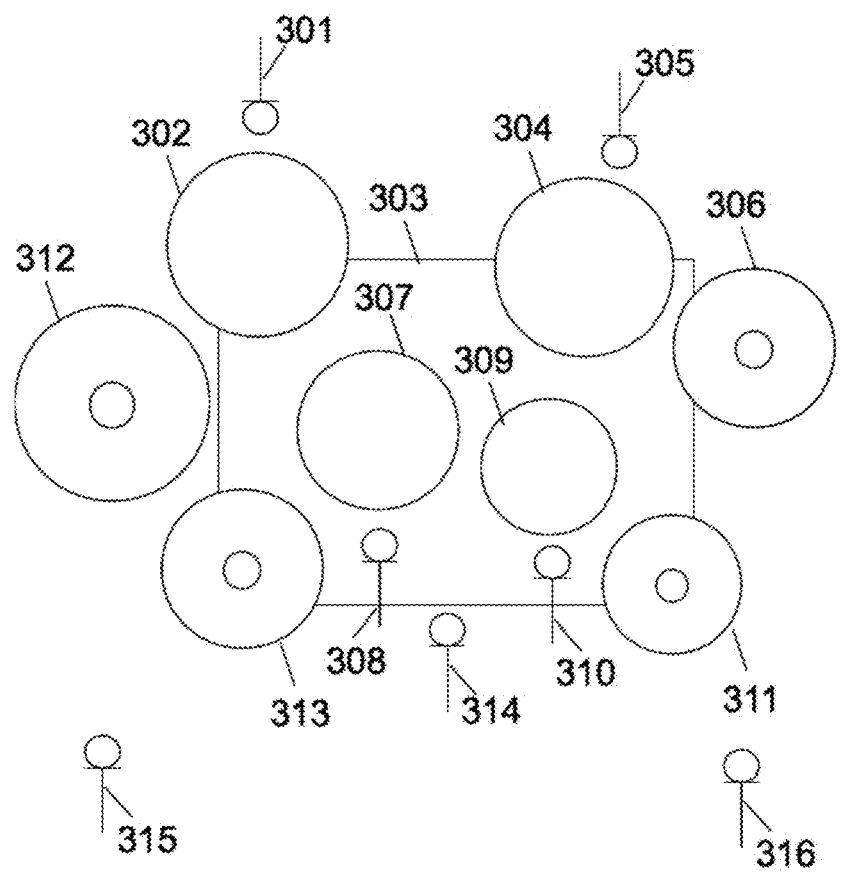
FIG. 3 illustrates an exemplary schematic representation of a sound engineering setup for capturing a drum kit.

In FIG. 3, an exemplary setup of a drum kit and corresponding microphones are presented. A drum kit is usually built from several drums and cymbals. Dedicated microphones are usually placed in order to capture the sound of some of the individual sound sources. For example, in FIG. 3 the sounds of the kick drum 303, the snare drum 304, the floor tom 302, the mid tom 307 and the high tom 309 are captured from microphones 314, 305, 301, 308, 310, respectively. This exemplary drum kit also contains several cymbals: a hi-hat 306, a ride 312 and 2 crash cymbals, 313 and 311, that aren't associated with a close microphone. There are also 2 ambient microphones 315 and 316, which can typically capture the acoustic image of the drum kit as a whole. It's important to note that even for the case of a drum kit where the sound sources are relatively close to one another, the effect of the acoustic paths on the captured sound is very significant. Therefore, the sound of each sound source will be significantly different in each one of the microphones.

Figure 4:
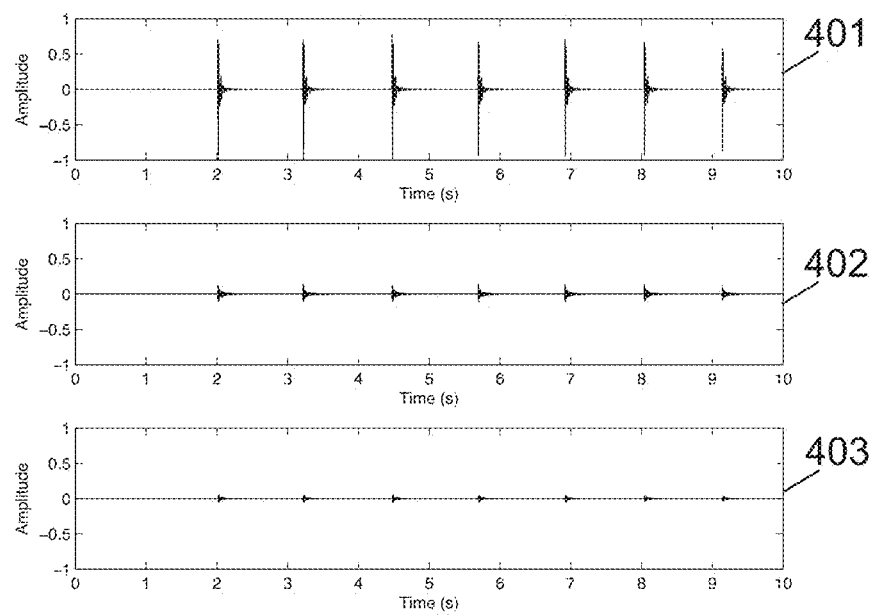
FIG. 4 illustrates an exemplary schematic representation of the effect of different acoustic paths in a drum sound.

FIG. 4 shows an illustrative example of the effect of different acoustic paths for a sound recording (for example a kick drum). In 401 the time domain signal as recorded from the close microphone is shown. In 402, and 403 the recordings from 2 other microphones are shown. The effect of the acoustic path is clear even in the time domain, since the different source-receiver distances have resulted in a different amplitude for the three recordings 401, 402, 403. The effect is also prominent in the frequency domain, where the effect of individual reflections from nearby surfaces and the room reverberation will be also visible. The unique qualities of each captured version of this sound signal are important from a sound engineering perspective and can be used by a human or an algorithm in order to provide a superior mixing result.

Traditional training methods of machine learning algorithms did not take into account the effect of the acoustic path. In order, for example, to train a machine learning algorithm for the snare drum 305, one could use any available recording of archetypical snare drums or any available recordings of the specific snare drum. However, exemplary embodiments can take into account the different acoustic paths from the snare drum 305 to one or more of the available microphones 301, 305, 308, 310, 314, 315, 316.

In a specific embodiment, the signal path can be taken into account implicitly by using in the training phase of one or more sounds captured from the additional microphones (for example microphones 301, 305, 308, 310, 314, 315, 316). In other embodiments, the signal path can be taken into account explicitly by modeling the signal path contribution.

Figure 5:
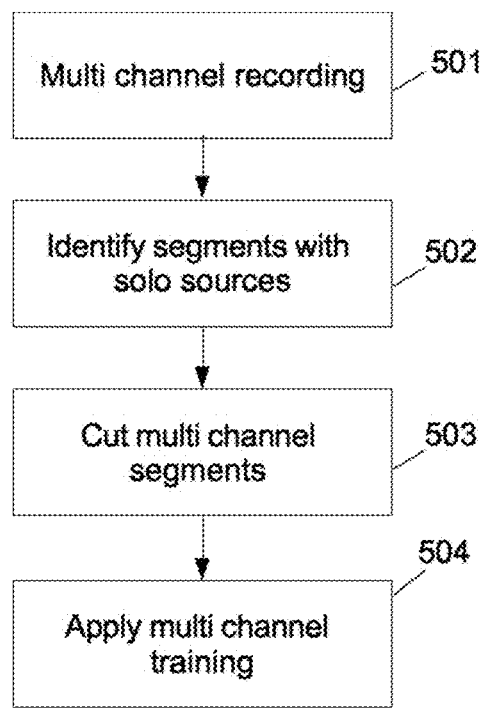
FIG. 5 illustrates an exemplary schematic representation of a method for obtaining multichannel training data from recordings.

In another embodiment, multi-sensor data representing each individual source can be obtained. These data can be used in any machine learning algorithm, for example in a source separation algorithm. For example, in the case of audio signals, solo recordings of single audio sources in more than one microphone can be obtained. There are many ways to obtain such data and they are all in the scope of the present disclosure. For example, in many music arrangements it's quite frequent to locate parts where an instrument has a solo part. In these cases, it is possible to obtain the multichannel segment of the solo instrument in all available microphones. FIG. 5 shows an exemplary embodiment where multichannel segments of solo sources 502 are identified in a multichannel recording 501. The identification of the segments of interest can be done manually from a user (e.g., a sound engineer) or automatically via an appropriate algorithm. Then, the solo multichannel segments are separated from the rest of the recording 503 and used for multichannel training of a single source 504. Since each solo source is captured from all available microphones, different acoustic paths are taken into account during training. The proposed approach can be also applied in real-time without having access to the recordings. In exemplary embodiments, a user or an algorithm can turn training on and off during an event and the training dictionary changes in real-time. Note that the training signals or training results may be captured in advance (during a start-up or initialization or sound check timeframe) as well as during the steady state operation or during a performance.

In other embodiments, dedicated recordings can be made in order to ensure that solo parts of single sources are available. In live or studio setups a sound-check step can precede the actual performance. During the sound-check the sound engineers and technicians prepare the stage, place the microphones, connect and test the equipment, tune the instruments and the sound system, etc. During the sound-check there's typically enough time to capture multichannel recordings from all possible sources (including but not limited to singers' voices, electronic or acoustic musical instruments, monitor speakers, PA speakers, etc) in all available microphones and then use some or all of them for training machine learning algorithms. The captured multichannel data will contain information not only from the sources of interest but also for all relative (on and off stage) acoustic paths.

In other embodiments, the multichannel data can be immediately used for on-the-fly training without the need for an actual recording or stored for later use. In other embodiments, the multichannel training data can be obtained in advance before the live event or studio recording. In other embodiments, the multichannel training data can be used interchangeably between similar microphone and acoustic setups. The training results can be used to train any machine algorithm in real-time during the performance or afterwards for post-processing. Anyone can trigger the sound sources including but not limited to the actual performers (e.g., singers, musicians), members of the technical crew or other individuals, automatic algorithms, mechanical devices, etc.

In a particular embodiment, multichannel training can be applied in a live event. After the setup of the event stage is made 601, the sound engineers can decide on the positions of the sound sources (for example the musical instruments) 602 and the sound receivers (for example the microphones) 603. In this way some or all relevant acoustic paths can be defined and can be kept relatively unchanged during the live event. Then each sound source can be "triggered" in order to capture the sound in all available microphones 604. The sound can be either recorded or used for on-the-fly machine learning training 605. Then the training results (i.e., the training dictionary) can be used during the live event 606 in any supervised or semi-supervised algorithm (that is, any algorithm that can take advantage of prior knowledge to assist in finding a solution) or even after the live event for post-processing. In the case that the position of a microphone or a source changes during the live event, then the acoustic path can also change. In one embodiment, the relevant training results (i.e., the training obtained from this microphone and/or source) can sometimes be omitted by the machine learning algorithm. In a particular embodiment the sound engineer of a live event can select whether certain training results will be taken into account or not via an appropriate interface. In another embodiment, the location of all sources and microphones is monitored from a video camera or any other appropriate device and an algorithm decides dynamically whether certain training results will be used or not.

In another embodiment, multichannel training can be applied in any audio recording application. A group of microphones are used in order to capture one or more sound sources, for example in a professional recording studio or a home studio. The sound of each sound source is captured from any available microphone, resulting in alternate versions of the sound sources due to the different acoustic paths. In a studio and/or recording, it's common that the acoustic paths will not change between the training phase and the recording phase and therefore embodiments of the present invention can sometimes be applied without controlling the usage of the training results.

The duration as well as the specific characteristics of the multichannel training data can play an important role on whether the produced training dictionary is beneficial for the machine learning task at hand. For example, in a live event or in a recording studio, the duration of the training data of each instrument must be long enough to ensure that all details of the instrument as played by the specific musician will be captured. In addition, it's advantageous to play the instrument in many different ways so that all possible performance variations are captured.

Figure 10:
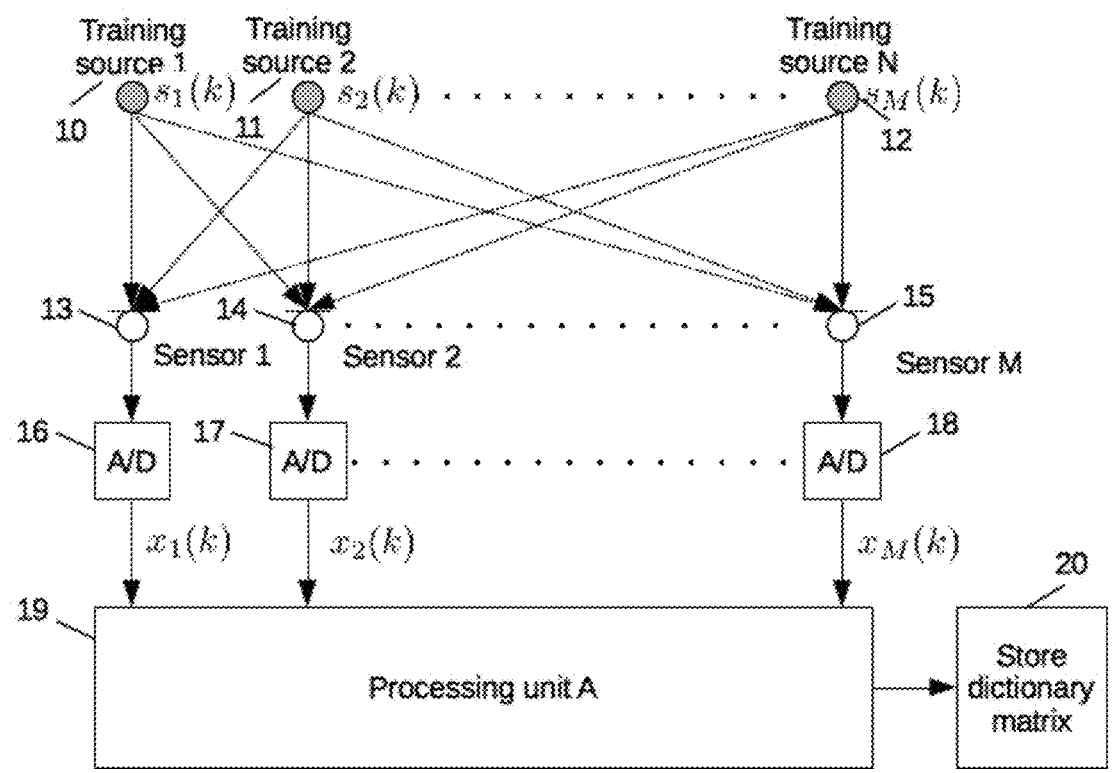
FIG. 10 illustrates an exemplary representation of a multi-source, multi-sensor setup used to generate an improved training dictionary in the form of matrix W.

In the previous paragraphs, a number of exemplary scenarios were described in which multi-sensor data is available and can be captured for training purposes. FIG. 10 discloses a number of exemplary embodiments that in general describe capturing training signals that provide information about multiple sources $s_n$ (depicted as 10, 11, 12 in FIG. 10) as received by multiple sensors $x_m$ (depicted as 13, 14 and 15 in Figure A) over multiple acoustic paths $a_{mn}$ (not shown). These training signals are then converted from analog to digital using A/D converters 16, 17 and 18. Note that the signals received in the sensors may also be processed or altered in the analog domain prior to A/D conversion. Subsequent to digitization, processing unit A (19 in FIG. 10) (which can include one or more processors, memory, storage, digital signal processor(s)) analyzes the digitized sensor data to produce training bases (elements of the training dictionary) that represent the various combinations of sources $s_n$ to sensors $x_m$ via acoustic path $a_{mn}$. The training dictionary generated by processing unit A (19 in FIG. 10) is symbolized by the W matrices. Subsequent sections describe a number of embodiments to generate the W matrices. Also described in FIG. 8B is a specific method to generate the W matrices. The generated W matrices are stored as depicted as 20 in FIG. 10.

Figure 11:
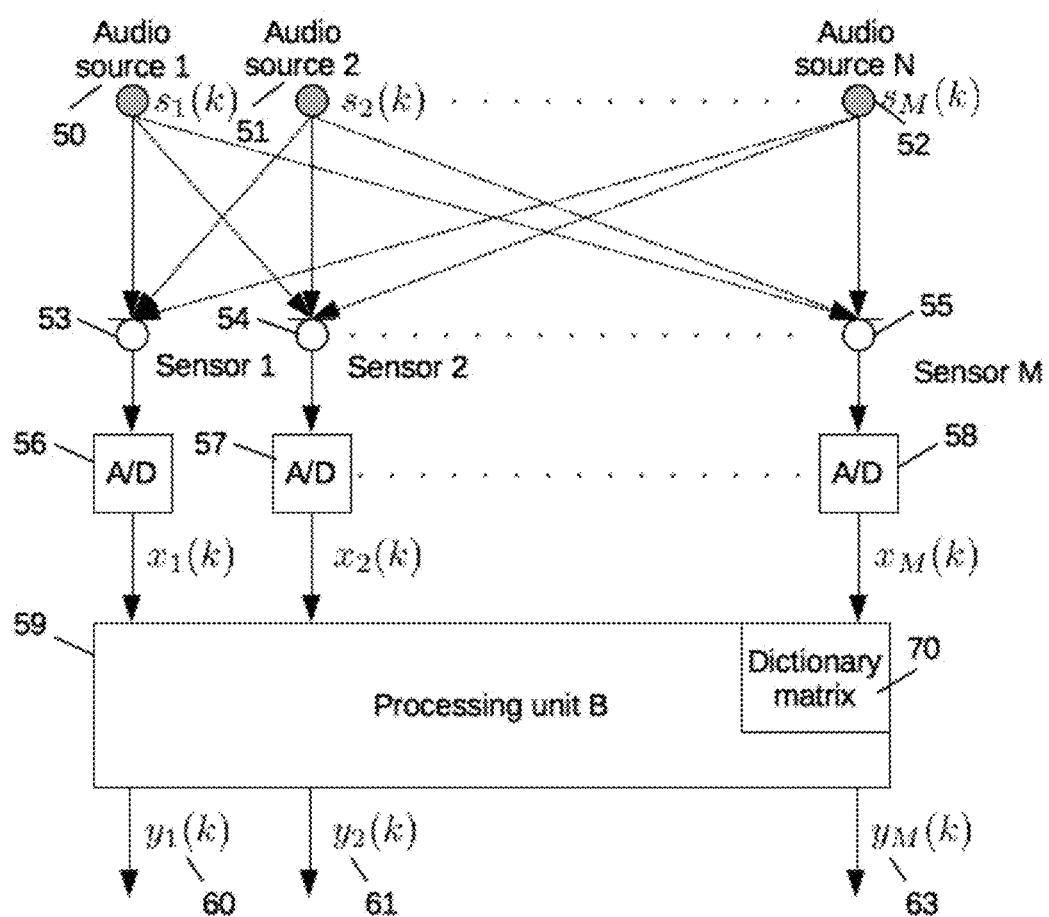
FIG. 11 illustrates an exemplary embodiment of how the improved training dictionary is used in order to improve tasks such as source separation in live music events or studio recordings.

FIG. 11 show an exemplary embodiment of how the W matrices generated (as described in FIG. 10) are subsequently used to analyze non-training data to perform any number of tasks, including improved source separation. Audio source data $s_n$ (depicted as 50, 51, 52 in FIG. 11) as received by multiple sensors $x_m$ (depicted as 53, 54 and 55 in FIG. 11) over multiple acoustic paths $a_{mn}$ (not shown). These audio signals are then converted from analog to digital using A/D converters 56, 57 and 58. Note that the signals received in the sensors may also be processed or altered in the analog domain prior to A/D conversion. The digitized signals are then processed in Processing Unit B (59 in FIG. 11) which uses the W matrix determined in FIG. 10 (as shown in 75 in FIG. 11) and produces output estimates $y_n$ (60, 61 and 63 in FIG. 11) of the digitized source signals $x_m$, i.e., the outputs are the separated sources generated by NMF processing appropriately converted back to the time domain. In an audio source separation application, these outputs are audible signals that represent each of the source signals $s_n$ captured by the sensors $x_m$. This process is described in detail in a subsequent section and is depicted within FIG. 8B. Processing Unit A and Processing Unit B may be within a computer, in one or more DSPs, part of a digital audio workstation or part of a sound console and can be implemented in software or hardware or any combination thereof.

In an exemplary embodiment, let's consider M microphones capturing N sound sources. The captured sound signals can be in the time domain or transformed to any other appropriate form. For example, one can obtain a time-frequency representation of sound signals by transforming them to the time-frequency domain with any method including but not limited to a short-time Fourier transform (STFT), a wavelet transform, a polyphase filterbank, a multi rate filterbank, a quadrature mirror filterbank, a warped filterbank, an auditory-inspired filterbank, a tree-structured array of filterbanks, etc. Although embodiments will refer to a spectrogram, it is apparent to anyone skilled in the art that any appropriate representation can be used without limiting the scope of the disclosed technology. All subsequent references to a time-frequency transform or transformation can include any one or more of the above methods.

In a multi-source, multi-sensor setup, let $x_m(k)$ be the digital microphone signal of the m-th microphone, where k is the discrete time index. As discussed previously this signal captures all source signals to some extent, that is:

$$x_m(k) = \sum_{n=1}^{N} s_{m,n}(k) \quad (1)$$

The signal $s_{m,n}(k)$ represents the sound of the n-th source as captured by the m-th microphone. It is understood here that the signal $s_{m,n}(k)$ includes the effect of the acoustic path between the n-th source and the m-th microphone. One can transform the time domain signal $x_m(k)$ to the time-frequency domain using any appropriate transform. In one embodiment, the short time Fourier transform (STFT) is used to obtain the complex values $X'_m(f, t)$ where f is the discrete frequency index and t is the time frame index. The magnitude values in some domain $\delta$, are obtained as:

$$X_m(f,t) = |X'_m(f,t)|^\delta \quad (2)$$

where $\delta > 0$. For each time frame t the values of $X_m(f, t)$ for all frequency bins f, can be arranged in a column vector $x_m(t)$ of size F×1. All vectors $x_m(t)$ can be arranged in a matrix $X_m \in \mathbb{R}_+^{F \times T}$ which is the magnitude spectrogram of the recorded microphone signal $x_m(k)$ in domain $\delta$. $X_m$ is a non-negative matrix with F rows, where F is the number of discrete frequency bins and T columns, where T is the number of frames. In the case of STFT, F is controlled by the FFT size and T is controlled by the hop size. Again, since each microphone captures the sound from all active sources, the spectrogram can be approximately written as:

$$X_m \approx \sum_{n=1}^{N} S_{m,n} \quad (3)$$

where $S_{m,n} \in \mathbb{R}_+^{F \times T}$ is the magnitude spectrogram of the sound of the n-th source as captured by the m-th microphone. Note that all spectrograms in Eq. (3) are in the same domain $\delta$. As discussed in FIGS. 1, 2 and 3, each spectrogram $S_{m,n}$ describes the sound of the n-th source under the effects of the acoustic path between the n-th source and the m-th microphone.

In one embodiment, the sources $S_{m,n}$ can be extracted from the microphone spectrogram $X_m$. In order to perform source separation, any appropriate technique can be used including but not limited to non-negative matrix factorization (NMF), non-negative tensor factorization, independent component analysis, principal component analysis, singular value decomposition, etc. In some embodiments NMF can be used to separate the sources. Each source spectrogram can be expressed as:

$$S_{m,n} = W_{m,n} H_{m,n} \quad (4)$$

where $W_{m,n} \in \mathbb{R}_+^{F \times K_n}$ is a matrix that contains a set of bases which can describe the spectral properties of the sound of the n-th source as captured by the m-th microphone. Each base is a column of $W_{m,n}$ and describes one fundamental aspect of the sound source in the domain defined by the F discrete frequency bins. Without loss of generality, assume that the first source (n=1) is a kick drum. $W_{m,1} H_{m,1}$ defines a model of the source spectrogram $S_{m,1}$ where $K_1$ is the chosen order of the model and represents the number of columns in the basis matrix $W_{m,1}$ and therefore $K_1$ defines the number of elements into which the source can be decomposed or separated or split (each of these terms are meant to be used interchangeably herein). In some cases, the order of a model is chosen to be higher for complex sources and lower for simpler sources. If, for example, one works in the time-frequency domain then $S_{m,1}$ is a spectrogram of the kick drum recording in microphone m and $W_{m,1}$ are spectral representations of one or more elements of the kick drum sound as captured from microphone m. For each of the T audio frames, the matrix $H_{m,n} \in \mathbb{R}_+^{K_n \times T}$ contains the activation functions (or gains or weights) for each basis function. Each row of $H_{m,n}$ indicates how active the corresponding column of $W_{m,n}$ is in that particular time frame. When the basis functions of $W_{m,n}$ are combined according to the activation functions of $H_{m,n}$ an estimate of the spectrogram $S_{m,n}$ is produced.

In order to perform training in supervised or semi-supervised NMF, specific, prior knowledge of one or more sound sources can be leveraged. This prior knowledge can sometimes provide a prior or initial estimate of one or more of the corresponding basis functions in $W_{m,n} \in \mathbb{R}_+^{F \times K_n}$. Estimates of the basis functions can be called a training dictionary.

As described above, in prior systems multi-sensor information is not explicitly taken into account while training, and the effect of the acoustic path is effectively neglected. In many applications there is only one signal path of the source signal that's interesting for the user. For example, in the case of medical imaging, there's only one "true" representation of a source signal that corresponds best to the physical reality. In other applications such as music related applications, each version of a sound source as captured from different microphones can be useful and open up new creative possibilities for the musicians/sound engineers. This is because the acoustic path (although it's sometimes considered a sound distortion) can become an inherent element of the sound and contribute to the auditory experience of listening to the sounds. Inspired by this idea, the present technology extends the notion of multichannel training to allow for expansion in the feature domain so that sounds from a source that are captured in each microphone are considered. An example of this is where a microphone other than the singer's microphone will pick up the singer's voice (e.g., the guitar microphone that is nearby). This introduction of new degrees of freedom in the choice of basis functions expands the training dictionary used to assist in convergence of iterative algorithms (such as, but not limited to, NMF). The new training dictionary includes basis functions (or bases) that account for the specific acoustic paths and for bases that are dependent upon the location of the sources and sensors and the fact that each sensor may have relevant information about multiple sources.

Figure 6:
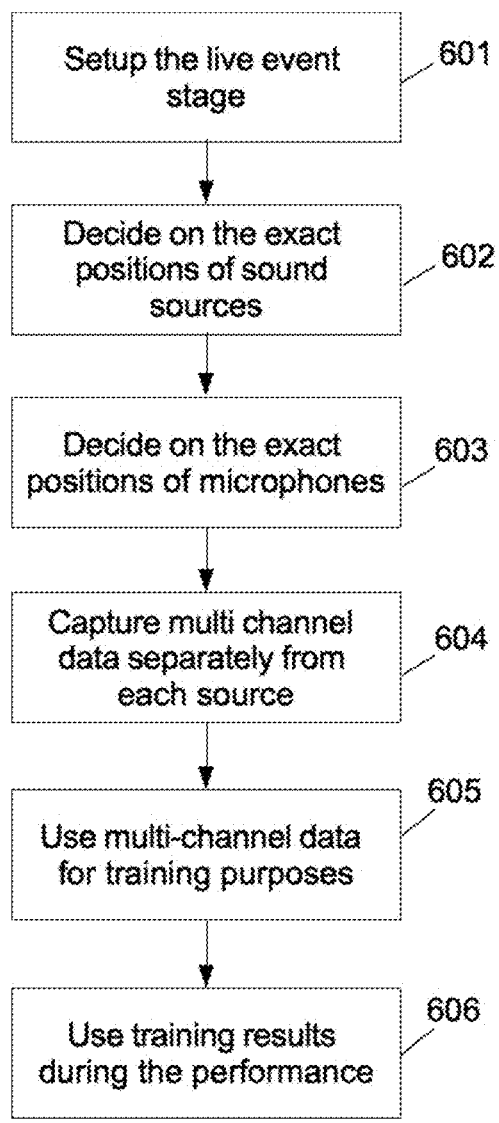
FIG. 6 illustrates an exemplary schematic representation of a method for obtaining multichannel training data in a live event.

In effect, training data for many individual source-sensor pairs can be produced and therefore the technology allows the expansion of the feature domain and obtaining of features that are tailored to the multi-sensor environment that one is encountering. In particular embodiments this can be done by using solo recordings of some or all of the sound sources in one or more of the available microphones, using the methods provided in FIGS. 5 and 6.

In another embodiment, the multichannel training data obtained during the training phase can be processed before producing the training dictionary. In some embodiments it is beneficial to identify and remove silence parts from the training data before using them to produce the training dictionary. The silence removal procedure can be made automatically or by a user and can be made in the time domain or in the time-frequency domain or in any other domain. The motivation for removing the silence parts before producing the training dictionary is that silence is not a representative characteristic of the training data that one necessarily wants to capture and might skew the training dictionary to contain non-relevant information.

In one embodiment, a tensor unfolding technique is used to account for multichannel (or multi-sensor) information. In this case, the following observation can be made: each microphone records all of the sound sources approximately at the same time instant. That is, when the n-th source is active, it is active in all microphones at the same time. This holds for reasonable distances between microphones so that the time difference between each microphone fits within one time frame. Hence $H_{i,n} = H_{j,n} \forall i,j=1, 2, \ldots, M$ and thus Eq. (4) becomes:

$$S_{m,n} = W_{m,n} H_n \qquad (5)$$

and therefore the activation functions for each source $H_n$ are common across all M microphones.

In addition, a matrix $W_m$ is defined, which contains the set of bases (or basis functions) that describe all the sound sources as captured by the m-th microphone:

$$W_m = [W_{m,1} W_{m,2} \ldots W_{m,N}] \qquad (6)$$

The matrix $W_m$ is of size F×K (where $K = \Sigma_n K_n$). As discussed above each matrix $W_{m,n}$ includes $K_n$ bases that describe the n-th source as captured by the m-th microphone. Hence, the matrix $W_m$ contains all the bases that describe how all of the N sources are captured by the m-th microphone. In addition, we can define the matrix H of size K×N, which contains gains for the basis functions in $W_m$:

$$H = [H_1^T H_2^T \ldots H_N^T]^T \qquad (7)$$

By combining (4), (6), (7) we have:

$$X_m = W_m H \qquad (8)$$

Therefore the matrix $W_m$ captures the spectral properties of each sound source in microphone m, while H captures the corresponding time-domain activations. Now, let us formulate the multichannel spectrogram as:

$$\overline{X} = [X_1^T X_2^T \ldots X_M^T]^T \qquad (9)$$

The multichannel spectrogram is a collection of the individual channel spectrograms and reflects the time-frequency characteristics of all sources as captured by all microphones. Then (6) can be written as:

$$\overline{X} = \overline{W} H \qquad (10)$$

where $\overline{W} \in \mathbb{R}_+^{MF \times K}$ can be written as:

$$\overline{W} = [W_1^T W_2^T \ldots W_M^T]^T \qquad (11)$$

Since each matrix $W_m$ describes how all sources are captured in each microphone m, the multichannel basis matrix (i.e., the dictionary matrix) $\overline{W}$ describes how all sources are captured by all microphones. $\overline{W}$ has a well-defined structure and can be written as a block matrix. In an exemplary embodiment, the multi-sensor training scheme presented herein can be applied to the tensor unfolding scenario by combining (6) and (11):

$$\overline{W} = \begin{bmatrix} W_{1,1} & W_{1,2} & \ldots & W_{1,N} \\ W_{2,1} & W_{2,2} & \ldots & W_{2,N} \\ \vdots & \vdots & \ddots & \vdots \\ W_{M,1} & W_{M,2} & \ldots & W_{M,N} \end{bmatrix} \qquad (12)$$

Each submatrix $W_{m,n}$ contains the set of bases that describe how the n-th source is captured by the m-th microphone. The "columns" of the block matrix $\overline{W}$ ($W_{m,n}$ for a given n) describe how each source is captured by all microphones, while the "rows" of the block matrix $\overline{W}$ ($W_{m,n}$ for a given m) describe how all sources are captured by each microphone. The NMF framework which provides the factorization (10) can be semi-supervised or supervised where a part or all of $\overline{W}$ respectively is known beforehand via some form of training. In some embodiments, more rows or columns can be added in $\overline{W}$ in order to form a new dictionary matrix $\overline{W}$. The columns or rows can be initialized with any appropriate method. These extra rows or columns can sometimes account for characteristics that are not captured at the training phase.

In other embodiments, means to obtain the blocks of the matrix $\overline{W}$ are provided. As a first step one can obtain the multichannel spectrogram $\overline{X}^n$ when only the n-th source is active. This can be done with any method, including but not limited to the methods discussed in FIGS. 4, 5 and 6. Then one can factorize the multichannel spectrogram as:

$$\overline{X}^n = \overline{W}^n H \quad (13)$$

where $\overline{W}^n$ is the n-th "column" of the block matrix (12), that is all submatrices $W_{m,n}$ for a given n and m=1, 2, . . . , M.

$$\overline{W}^n = [W_{1,n}{}^T W_{2,n}{}^T \ldots W_{M,n}{}^T]^T \quad (14)$$

In general $\overline{W}^n$ can be interpreted as a dictionary that describes the sound of the n-th source in different microphones. The information in matrix H can be used to further constrain the analysis NMF problem or can be discarded. In another embodiment, $\overline{W}^n$ can be equal to $\overline{X}^n$, or it can be formed as any appropriate submatrix of $\overline{X}^n$. Any method that extracts all or part of the training dictionary from $\overline{X}^n$ is in the scope of the present invention. Note that during training not all sources may be available. If so, one can initialize the missing "columns" of the block matrix $\overline{W}$ with any appropriate method. In other embodiments, the multi-sensor training methods described herein can be combined with traditional training techniques, where, for example, a single-channel NMF can be performed in order to obtain each element of the matrix $\overline{W}$ of (12).

Figure 7:
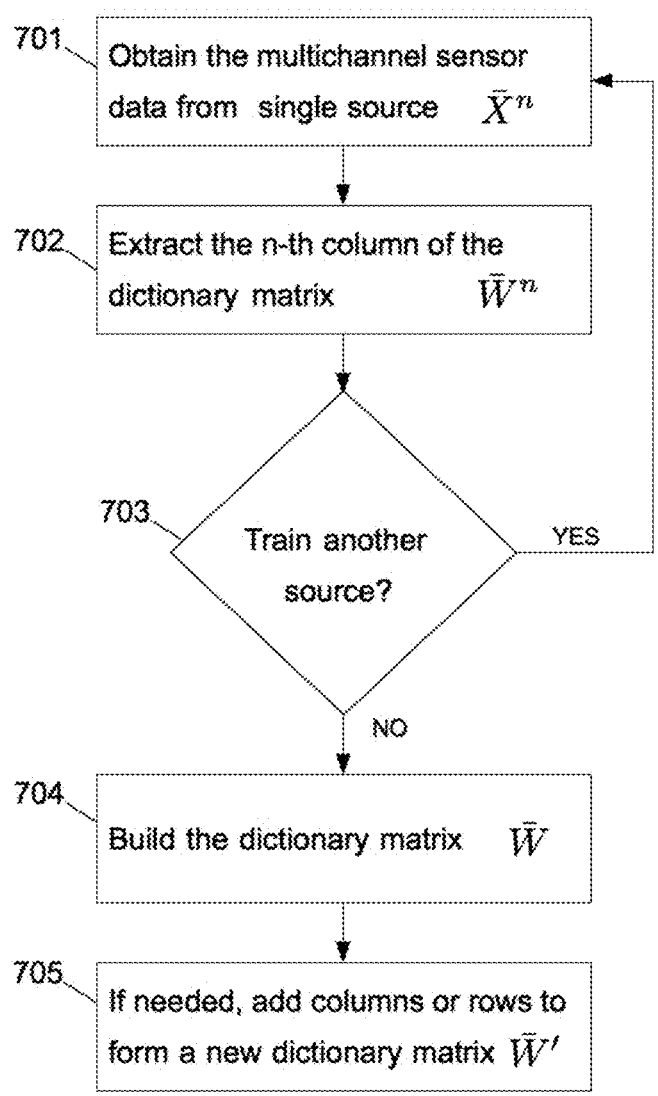
FIG. 7 illustrates an exemplary schematic representation of a method that builds a training dictionary.

FIG. 7 presents an exemplary embodiment, where multi-sensor data from one or more sources are used for producing improved intelligent training dictionaries that capture multi sensor information. At first, multi-sensor data from one source is obtained 701 and used to extract the dictionary elements that correspond to that source with any appropriate method 702. This procedure is repeated 703 for all sources for which multi-sensor data is available. In other embodiments, one might choose to not use all available data and perform training only on the most significant data. Then all the elements from different sources are used to build the dictionary matrix 704. Finally, if there's a need, more columns or rows can be added to the matrix 705.

In an exemplary embodiment, the multichannel training procedure is applied to drums. Drums are typically captured by more than one microphone and therefore it can be beneficial to use multichannel training. For the case of drums, in some embodiments the drummer plays single drum hits of one or more drum elements, which are captured by one or more microphones and stored in a storage unit. The recordings can be then used to produce a training dictionary. In other embodiments, the drummer plays actual playing variations of a single drum element, which are recorded and stored in a storage unit/device/system(s) and these recordings can be then used to produce a training dictionary. In other embodiments, the drummer is required to play both single hits and actual playing variations of one or more of the drum elements, which are recorded and stored in a storage unit. The above single or multichannel drum element recordings as captured by one or more of the available microphones can be used to produce one or more training dictionaries.

In another embodiment, the multi-sensor training procedure described herein can be applied directly in a non-negative tensor factorization (NTF) framework. Instead of "stacking" microphone spectrograms $X_m$ as in Eq. (9), consider creating a $3^{rd}$ order tensor X with dimensions F×N×M. Any NTF model is in the scope of the present embodiment, although for exemplary reasons the exemplary embodiment uses the PARAFAC model (see Section 1.5.2 in A. Cichocki, R. Zdunek, A. H. Phan, S.-I. Amari, "Non-negative Matrix and Tensor Factorization: Applications to Exploratory Multi-way Data Analysis and Blind Source Separation", John Wiley & Sons, 2009) (which is incorporated herein by reference in its entirety). This model is written for each element of the involved matrices as:

$$x_{fnm} \approx \sum_{k=1}^{K} w_{fk} h_{kn} q_{km} \quad (15)$$

where $W \in \mathbb{R}_+^{F \times MK}$ and $H \in \mathbb{R}_+^{MK \times N}$ represent the same quantities as in Eq. (4). Matrix $q \in \mathbb{R}_+^{K \times M}$ represents the contribution (or gain) of each source (or component discovered by the NTF) in each of the M channels/microphones. Consider reshaping the training matrix $\overline{W}^n$ of eq. (13) and (14) as:

$$\tilde{W}^n = [W^{1,n} W^{2,n} \ldots W_{M,n}] \quad (16)$$

Based on each of the N sources multi-sensor training matrix $\tilde{W}^n$ one can create a total training matrix $W \in \mathbb{R}_+^{F \times MK}$:

$$\tilde{W} = [\tilde{W}^1 \tilde{W}^2 \ldots \tilde{W}^N] \quad (17)$$

The matrix of Eq. (16) can be used with Eq. (15) to provide a supervised or semi-supervised NTF of the tensor X.

Figure 7A:
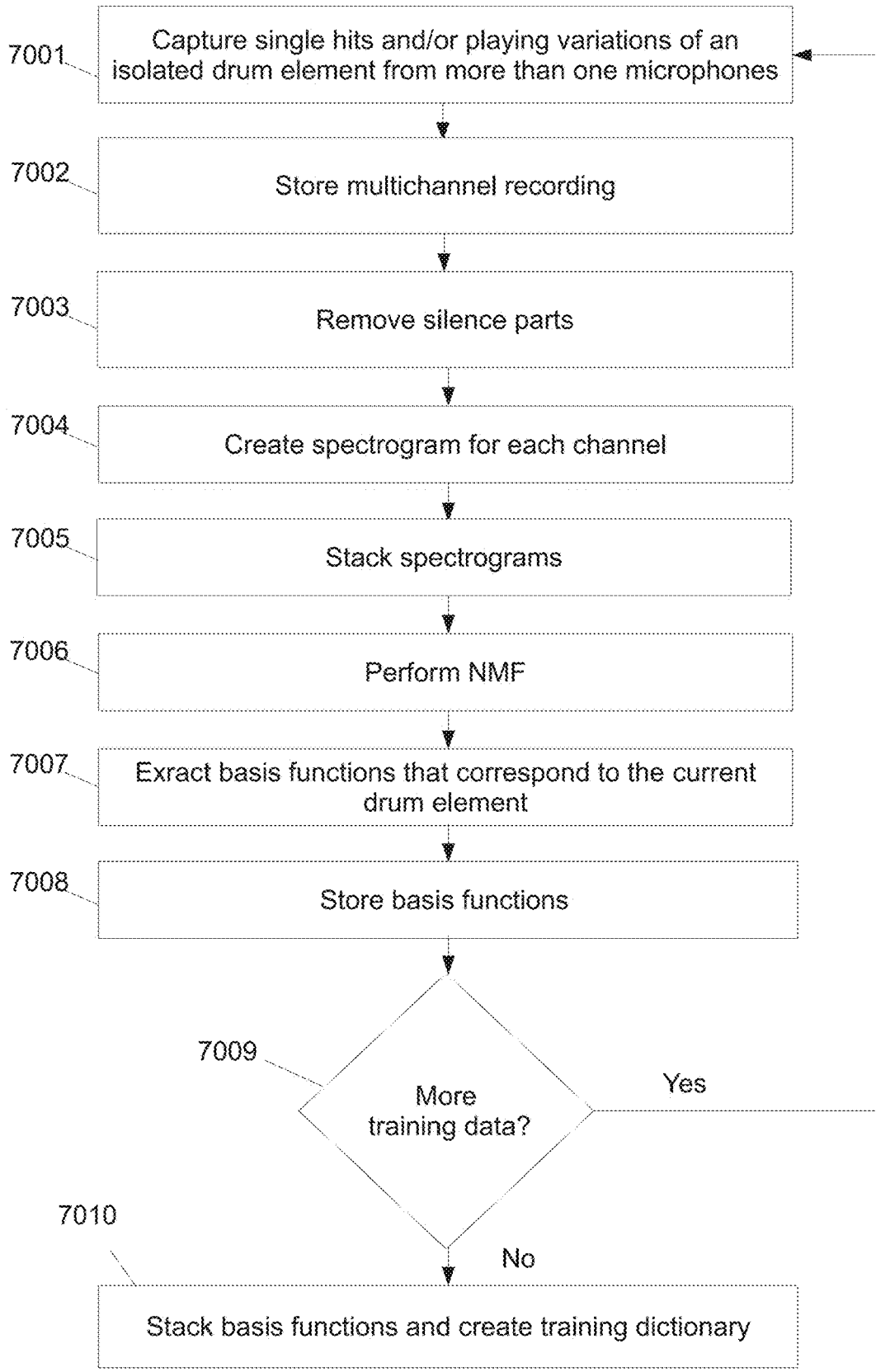
FIG. 7A illustrates an exemplary schematic representation of a method that builds a training dictionary for drums.

FIG. 7A presents an exemplary embodiment where multichannel instrument recordings (e.g., recordings of isolated drum elements) are used to produce a multichannel training dictionary. Initially single hits and/or actual playing variations are captures from a drummer 7001 and stored in an appropriate medium 7002, for example the hard drive of a personal computer. Optionally the silence parts 7003 can be removed, either automatically or manually. After the optional silence removal step, a time-frequency domain transform is performed and the corresponding spectrograms are created 7004 for each microphone signal. Then the microphone spectrograms are stacked 7005 and multichannel NMF is performed 7006. The basis functions are then extracted that correspond to the specific drum element in each microphone 7007 and the basis functions 7008 stored. These basis functions will contain information for the relative acoustic paths. Then the procedure is repeated for every drum element for which one wants to provide a contribution to the training dictionary 7009. Then the basis functions are combined and create the improved multichannel training dictionary 7010 created. This training dictionary can be then used in, for example, every recording of this drum set, in order to perform machine learning tasks such as source separation in one or more of the available microphones Although this example has been presented for drum recordings, it's obvious to anyone skilled in the art that the same principle may apply to other instrument recordings, or to any recorded sound in general.

Figure 7B:
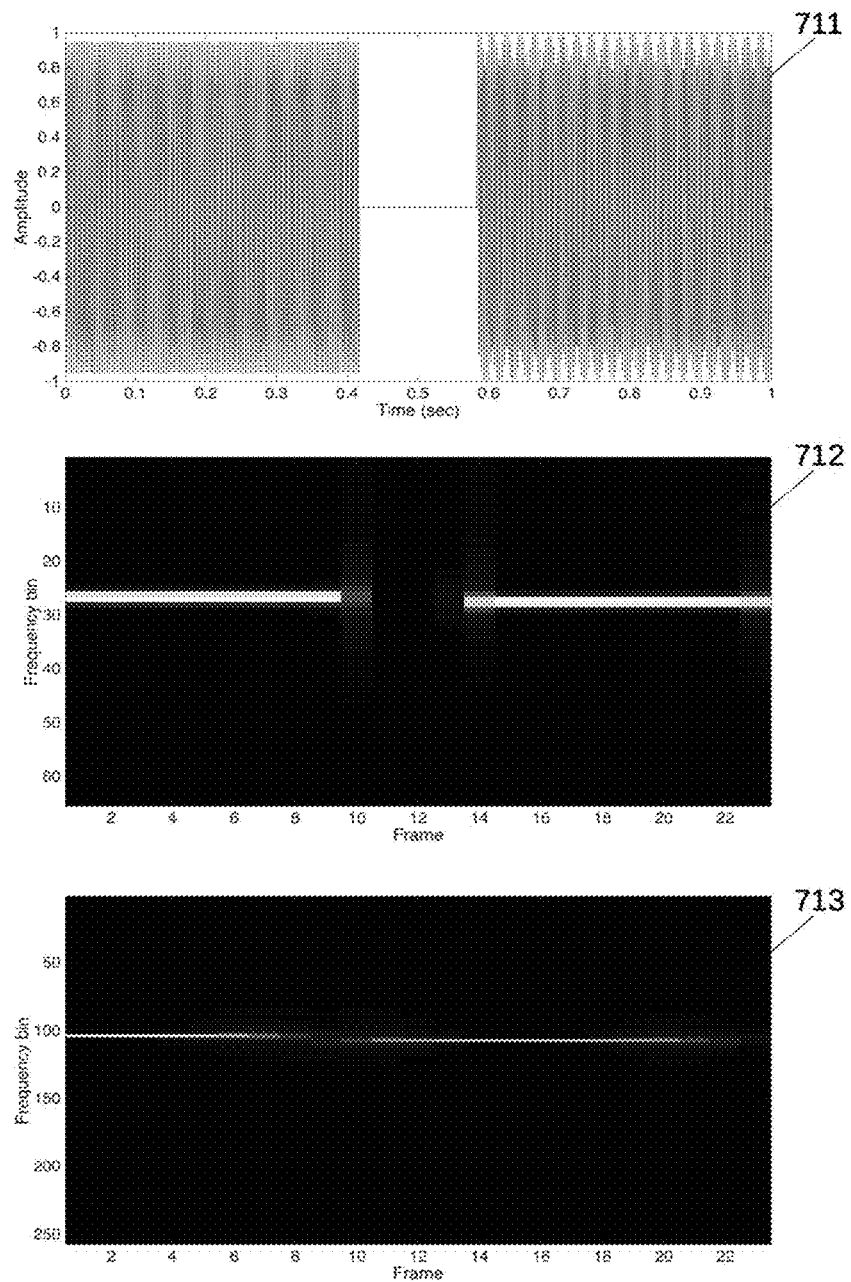
FIG. 7B illustrates an exemplary schematic representation of a signal's magnitude spectrogram with two different time-frequency resolutions.

Training Data Captured Using Multiple Time-Frequency Resolutions:

Another exemplary use of the data captured in training (as described above) in order to generate an intelligent training dictionary follows. When calculating any time-frequency transform the time-frequency resolution is one of the most important trade-offs one has to make, since the Heisenberg-Gabor limit imposes that a function cannot be both time limited and band limited. Therefore, signal processing methods behave differently depending on the chosen time-frequency transform and/or resolution. FIG. 7B illustrates an example of the effect of different time-frequency resolutions. 711 shows two sine waves of different frequencies 300 Hz and 310 Hz, separated by silence (time gap). Using the STFT and choosing a short window length results in good time resolution and poor frequency resolution or, in other words, the signals are well localized in time and poorly localized in frequency. This is shown in 712 where the time gap between the signals is clearly visible, while their frequency content is spread across several frequency bins and the content of both signals overlaps significantly in frequency. While a signal processing algorithm could detect the two separate events in time easily, it would be more difficult to find out which event corresponds to which frequency content. On the other hand, choosing a long window length results in poor time resolution and good frequency resolution or in other words the signals are poorly localized in time and well localized in frequency. This is shown in 713 where the time gap between the two signals is no longer as clear while the frequency content of each signal has become more defined. A signal processing algorithm could easily detect the two different signals in frequency but it would be difficult to estimate when each signal begins and ends.

One of the exemplary purposes of this technology is to describe a new method to relax the requirement to choose a single time-frequency resolution when performing signal processing functions and overcome the limitations shown in FIG. 7B. In an embodiment, different time-frequency transforms are calculated on the same data, each with a different time-frequency resolution. In general, the time frequency resolution that a specific time frequency transform accomplishes is based the selected values of the parameters of the transform. In the case of STFT the chosen window length L dictates the time-frequency resolution. The length L can be defined in samples or time duration. Assume a digital signal $x(k)$ is sampled with a sample rate fs. Performing an STFT on $x(k)$ with a window length of 256 samples and another STFT on the same signal with a window length of 1024 samples will produce different results as shown in FIG. 7B, due to the different time-frequency resolutions. If the digital signal $x(k)$ was sampled at a higher sample rate of 2 fs, an STFT with a window length of 512 samples would be required to provide the same time time-frequency resolution as the window length of 256 samples at fs. These different time frequency transforms capture different aspects of the original time domain signal and represent them as different distributions of time-frequency energy on a grid of linearly spaced frequency bands and time frames. In order to use these different representations within a single iterative technique, the outputs of the different time-frequency transforms are "mapped" to a new time-frequency domain with a common frequency resolution. Note that the time-frequency grid may not be common between different transforms and this is manageable within the constructs of the training dictionaries as described in more detail below. The time-frequency mapping can be any operation that changes the spacing and/or the number of the frequency bands, including combining certain frequency bands, adding bands, averaging bands, or the like. Note, that this operation does not alter the time-frequency resolution but its representation on a specific time-frequency grid. Simply put it's another way to look at the data produced by a specific time-frequency transform and allows the comparison and common handling of transforms with different time-frequency resolutions. After the mapping, the resulting common frequency bands may be uniform or non-uniform, that is, a single mapped band may represent a larger portion of the overall spectrum than another mapped band. Note that this type of transformation from a time signal to non-uniform frequency bands can also be accomplished with other time-frequency transforms, in addition the method described above using a STFT followed by a frequency mapping. This is to be understood in the sequel as well, where we describe in detail the STFT followed by frequency mapping approach, but it is understood that any technique that takes a time domain signal and creates multiple time frequency representations which capture different aspects of the signal and have a common set of frequency bands.

A signal processing algorithm (such as an NMF decomposition) is applied to the mapped transforms to provide a result that benefits from the fact that information is available regarding multiple time-frequency resolutions. In another embodiment, a signal processing algorithm is applied to the output of each different time-frequency transform. The results of each algorithm are then mapped to a new time-frequency domain with a common frequency resolution and combined.

In a particular embodiment, a training dictionary is created for a sound source which will capture aspects of the source in different time-frequency resolutions simultaneously. Assume that one has at least one training signal $x(k)$ that is for example, a recording of the sound source of interest. Using the STFT and similarly to (2) one can construct a set of magnitude spectrograms $X_p \in \mathbb{R}_+^{F_p \times T_p}$ in some domain $\delta$, from the training signal $x(k)$ using P STFTs with window lengths $L_p$ with $p=1, 2, \ldots, P$. Each spectrogram $X_p$ describes the same training signal $x(k)$ in the time-frequency domain with a different time-frequency resolution and captures different aspects of the signal. Note that in other embodiments, any appropriate time-frequency transform can be used to extract multiple spectrograms $X_p$ from the same signal $x(k)$ and all are within the scope of the present disclosure.

A set of appropriate frequency "mapping" matrices $B_p \in \mathbb{R}_+^{F_B \times F_p}$ is constructed that can be used to produce sets of new spectrograms $V_p \in \mathbb{R}_+^{F_B \times T_p}$ $$V_p = B_p X_p \tag{18}$$

The matrix $B_p$ maps the set of spectrograms $X_p$ to a set of spectrograms $V_p$ with a common number of frequency bands $F_B$. The set of spectrograms $V_p$ describe various aspects of the training signal $x(k)$ made observable under different time-frequency resolutions in a time-frequency domain with a common frequency resolution. In other embodiments, the set of spectrograms $V_p$ can be produced by choosing a common FFT size for all P STFTs. In this case $F_B=F_p$ for all p.

In a particular embodiment, each $V_p$ can produce parts of a training dictionary. For example, one can perform one NMF per matrix $V_p$ to obtain a factorization $V_p = \overline{W}_p H_p$ where $\overline{W} \in \mathbb{R}^{F_B \times K_p}$. The result of the different factorizations can be combined as:

$$\tilde{W} = [\overline{W}_1 \overline{W}_2 \ldots \overline{W}_P] \tag{19}$$

where $\tilde{W} \in \mathbb{R}_+^{F_B \times K'}$ where $K' = \Sigma_{p=1}^P K_p$. The matrix $\overline{W}_p$ contains a set of basis functions that model the spectral properties of the source of interest with p-th time-frequency resolution. The number of basis functions $K_p$ can be different for each matrix $\overline{W}_p$. This reflects the fact that different time-frequency resolutions bring out different aspects of the sources, which require different modeling parameters. $\tilde{W}$ is a matrix that contains the complete set of basis functions in a common frequency domain. These basis functions describe fundamental aspects of a sound source as captured from different time-frequency resolutions of the same training data. Note that in other embodiments, any appropriate method can be used to extract $\overline{W}_p$ from $V_p$ and they are all within the scope of the present disclosure.

Figure 8:
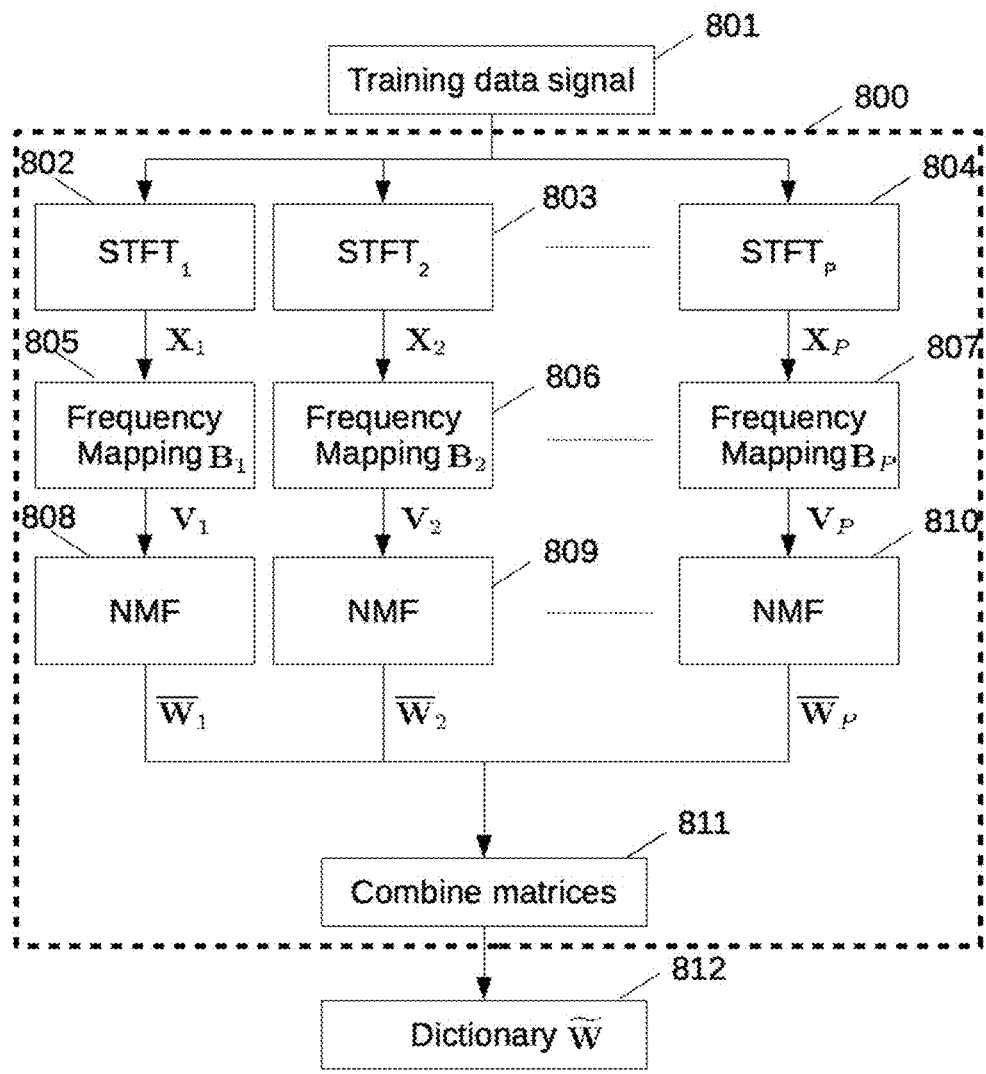
FIG. 8 illustrates an exemplary schematic representation of a method that combines training obtained from different time-frequency resolutions.

FIG. 8 shows another exemplary embodiment. The training data x(k) are obtained 801 and the steps included in 800 are used to produce the training dictionary $\tilde{W}$. More specifically, a first STFT transform with window length $L_1$ is applied 802 to provide the spectrogram $X_1$. A second STFT transform with a different window length $L_2$ is applied 803 on the same training data to provide the spectrogram $X_2$. The process is repeated until the final STFT transform with a window length $L_P$ is applied 804 to provide the magnitude spectrogram $X_P$. Then an appropriate frequency mapping is performed with a different mapping matrix $B_p$ for each STFT 805, 806, 807 to get the set of spectrograms $V_p$. A non-negative matrix factorization is performed 808, 809, 810 on each spectrogram $V_p$ to obtain the basis function matrices $\overline{W}_p$. The matrices are then combined 811 to provide the training dictionary $\tilde{W}$ 812.

Figure 8A:
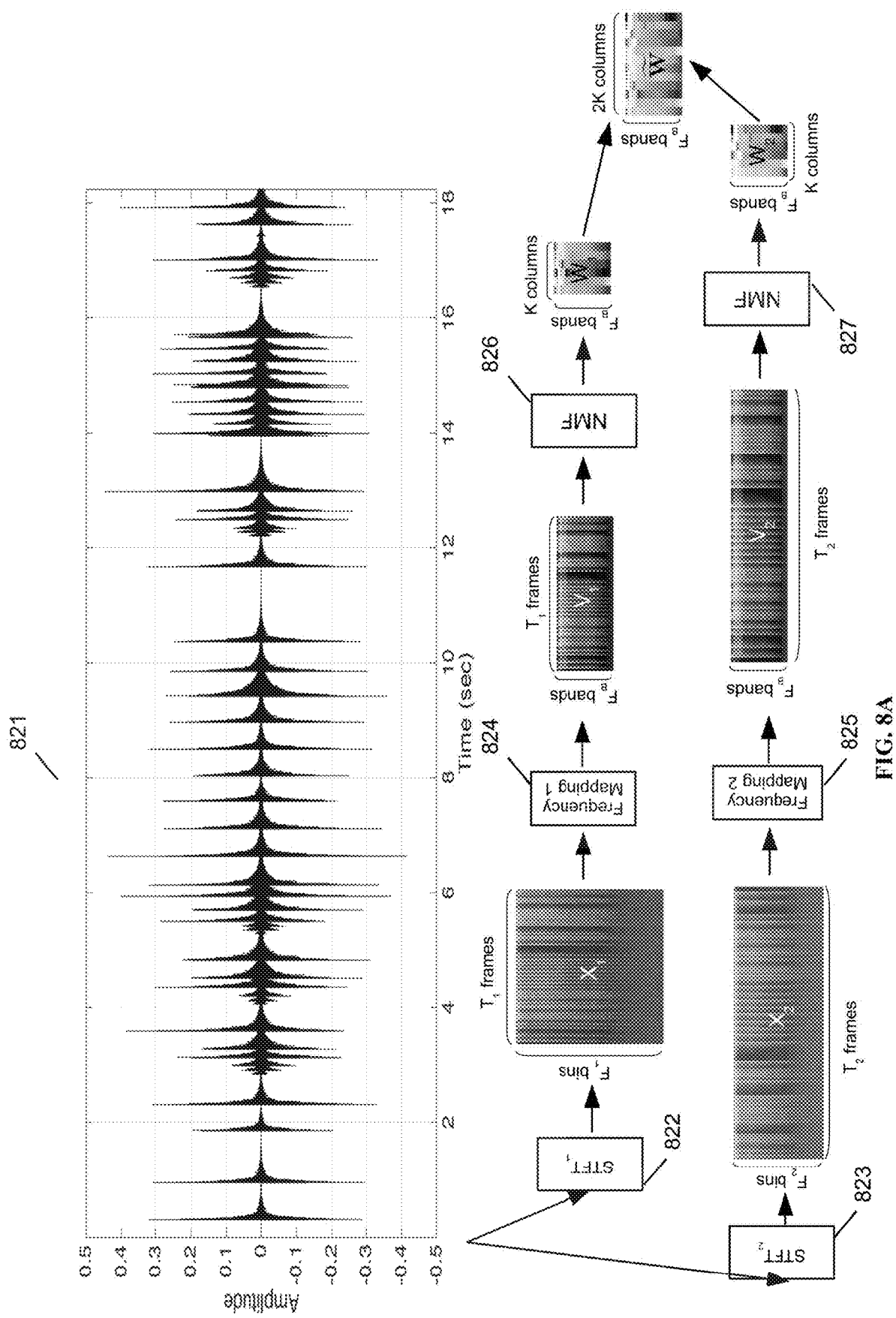
FIG. 8A illustrates an exemplary schematic representation of an embodiment of the invention for dual time-frequency resolution training.
Figure 8B:
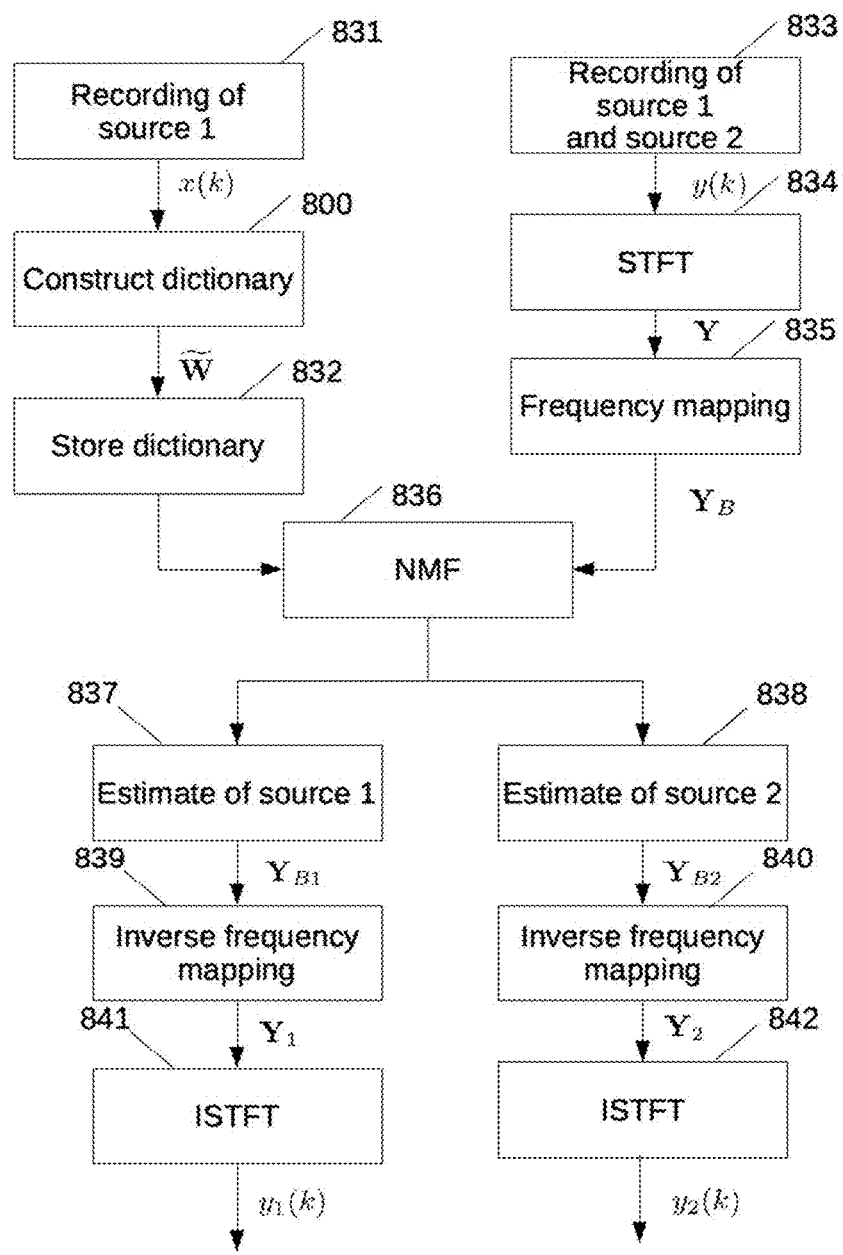
FIG. 8B illustrates an exemplary a method to generate W matrices.

FIG. 8A shows an exemplary embodiment for dual time-frequency resolution training. Note although the example here is presented for 2 time-frequency resolutions, the presented method is valid for any number of time-frequency resolutions. Typically, the number of chosen frequency-resolutions is decided based on the complexity of the sources and the task and it often comes as a trade-off between better performance and increased computational load. A training signal 821 is captured in the time-domain. A first STFT transform with window length $L_1$ 822 is applied on the signal to produce the first spectrogram $X_1$ with a specific time-frequency resolution. A second STFT transform with window length $L_2$ 823 is applied on the same signal to produce a second spectrogram $X_2$ with a different time-frequency resolution. These spectrograms are mapped 824, 825 by frequency mapping matrices $B_1$ and $B_2$ to a common frequency domain with $F_B$ bands and the spectrograms $V_1$, $V_2$ are produced. A first NMF 826 is applied on $V_1$ to produce $\overline{W}_1$. Each column of $\overline{W}_1$ describes one of the spectral properties of the training data for the first time-frequency resolution. A second NMF 827 is applied on $V_2$ to produce $\overline{W}_2$. Each column of $\overline{W}_2$ describes one of the spectral properties of the training data for the second time-frequency resolution. The two matrices $\overline{W}_1$, $\overline{W}_2$ can be combined since they describe the spectral properties of the same training data on the same frequency domain but with different time-frequency resolutions. This combination results in the training dictionary $\tilde{W}$. In other methods, improved training dictionaries extracted by methods shown in FIG. 8 and FIG. 8B can be combined to form a new improved training dictionary.

FIG. 8B shows an exemplary embodiment where the training dictionary $\tilde{W}$ is used in a source separation application for music recordings or live events. A recording x(k) of a first source is obtained 831. This could be for example a recording of an acoustic guitar with a microphone. This recording could be obtained during the soundcheck phase of a concert. This signal is used to construct a training dictionary 800 (as also described in detail in FIG. 8). The training dictionary that is generated as described in 800 is designated $\tilde{W}$ and is stored 832 to be used later. Note that the steps described in 831, 800 and 832 are directly related to what is described in FIG. 10. Another recording y(k) that contains the first source and a second source is obtained 833. This could be for example a recording of an acoustic guitar and a singer with the same microphone during the performance of an acoustic song. This recording could be obtained during the concert that follows the soundcheck phase. Typically the steps that begin at 833 occur after the dictionary that is created in 832 has been generated. This could also be a recording of a different acoustic guitar or in a different place or by a different musician. A source separation algorithm will attempt to extract an estimate of the acoustic guitar signal and the voice signal from the microphone signal y(k). The spectrogram Y of the microphone signal is produced using an STFT 834 with a window length $L_y$. This window length may be different than any window length $L_p$ used to obtain the dictionary or the same as one of window lengths $L_p$. One can use an appropriate frequency mapping matrix $B_y$ 835 to obtain $Y_B$ which represents the recording 833 in the common time-frequency domain of the training dictionary. Then one can use NMF 836 to factorize $Y_B$ as:

$$Y_B = \begin{bmatrix} \tilde{W} & U \end{bmatrix} \begin{bmatrix} G_W \\ G_U \end{bmatrix} \quad (20)$$

where $\tilde{W} \in \mathbb{R}_+^{F_B \times K'}$ is the training dictionary of the first source which was stored and can now be used, $U \in \mathbb{R}_+^{F_B \times K_u}$ are the unknown basis functions of the second source, $G_W \in \mathbb{R}_+^{K' \times T_y}$ are the activation functions of the first source and $G_U \in \mathbb{R}_+^{K_u \times T_y}$ are the activation functions of the second source. U, $G_W$ and $G_U$ are unknown and will be estimated by the NMF. $\tilde{W}$ can remain fixed or be used to initialize the NMF and be further updated by algorithm. After NMF, we obtain an estimate 837, 838 of each source $Y_{B1} = \tilde{W}G_W$, and $Y_{B2} = UG_U$. These estimates are mapped back 839, 840 to the original time-frequency domain of the STFT 834 using the transpose of $B_y$. Finally, an inverse STFT 841, 842 is applied to obtain time domain signals $y_1(k)$ and $y_2(k)$ which are estimates of the first and second source respectively.

The steps 833, 834, 835, 836, 837, 838, 839, 840, 841 and 842 in FIG. 8B are an example of an improved machine learning algorithm that utilizes a stored $\tilde{W}$ matrix that is determined using any of the techniques described herein, including those involving multi-sensor or multi-channel applications as well as those involving multi-resolution, e.g. involving bases matrices that include bases that represent multiple time frequency resolutions.

In another embodiment, the training dictionary $\tilde{W}$ can be used in recording studio applications for extracting source signals that have been captured in signal mixtures. For example, let's assume an example where a song arrangement contains a guitar (1 sound source), bass (1 sound source), drums (8 sound sources) and piano (1 sound source) and that four musicians (guitar player, bass player, piano player and drummer) simultaneously perform the song in the studio. The sound engineer can place N microphones to capture the song and unavoidably each microphone captures the sound of all musicians. In the previous art there's nothing that the engineer could do in order to completely isolate the sound of each musician in each microphone.

However, in this embodiment, special recordings for dictionary extraction (see block 800 of FIG. 8B) can precede the actual song recording. During this phase the musicians can provide isolated recordings of their instruments. The recordings can be made inside the main Digital Audio Workstation (D.A.W.) or using any other software of hardware module. Then we can process these recordings in multiple time-frequency resolutions in order to derive and store the dictionary $\tilde{W}$ (800), according to one exemplary embodiment.

In additional embodiments, the extraction of the dictionary (800) can be implemented inside a D.A.W. or in an external hardware unit(s). The sound engineer can, for example, decide which instruments will be recorded in isolation and therefore which instruments will be taken into account when forming the dictionary (800). The amount of time-frequency resolutions can be also set by the sound engineer (user) according to the complexity of the task. After the training phase, the dictionary can be stored and normal recordings of the song can be made. Then any real-time or offline source separation technique (for example NMF technique) can be used in order to process the microphone signals and extract isolated sources from the signal. The sound engineer can then use the new never-before-available isolated signals in order to create the desired song mix.

In another embodiment one can create a new matrix by combining the spectrograms $V_p$:

$$\tilde{V}=[\overline{V}_1 \overline{V}_2 \ldots \overline{V}_P] \quad (21)$$

where $\tilde{V} \in \mathbb{R}_+^{F_B \times T'}$ and $T' = \Sigma_1^P T_p$. The matrix $\tilde{V}$ is the combination of the training data transformations in the common time-frequency domain. $\tilde{V}$ contains combined information about the training data in various time-frequency resolutions. Applying NMF to $\tilde{V}$ a variant version of $\tilde{W}$ described in (19) is obtained which can be used as training dictionary that takes into account different time-frequency resolutions. Note that in other embodiments, any appropriate method can be used to extract $\tilde{W}$ from $\tilde{V}$ and they are all within the scope of the present disclosure.

Figure 9:
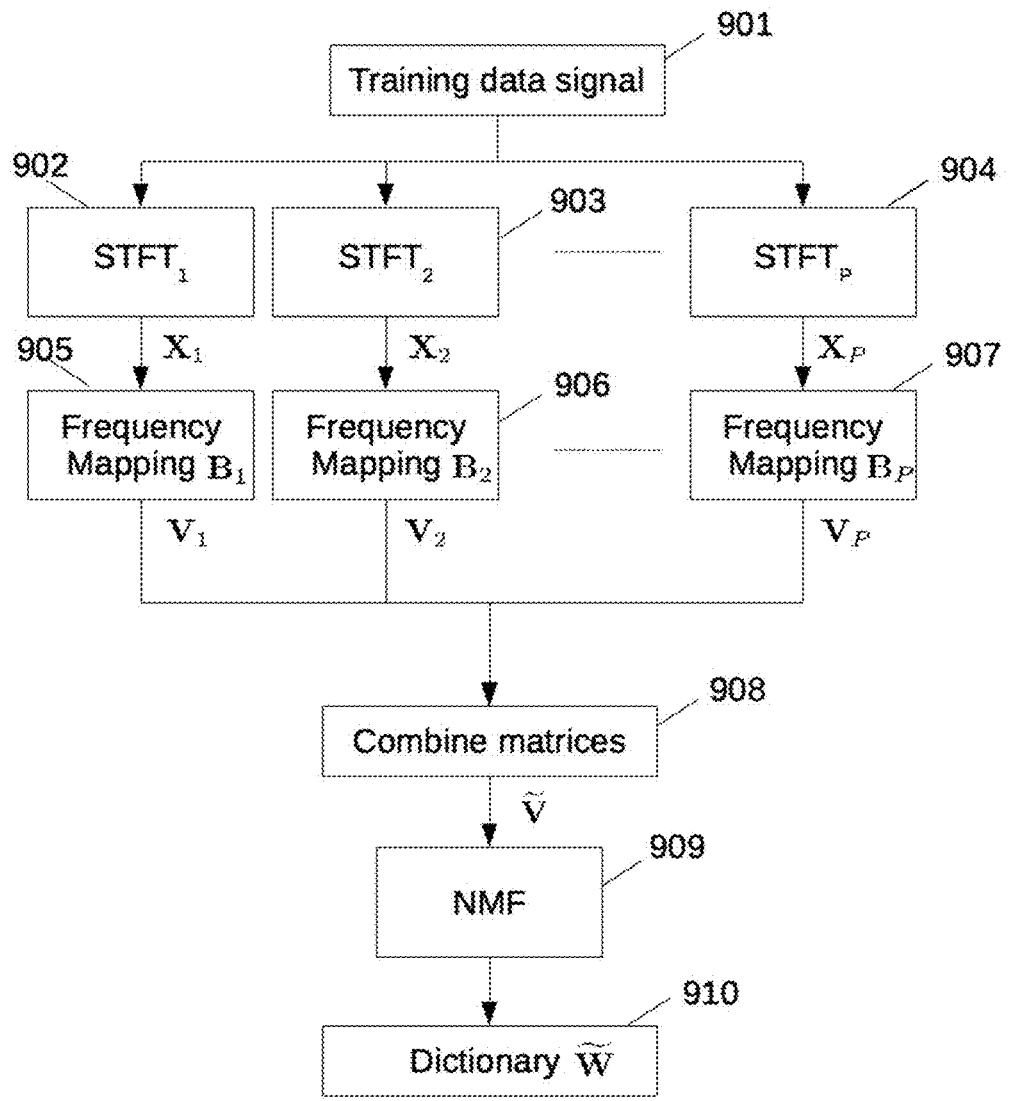
FIG. 9 illustrates an exemplary schematic representation of another method that combines training obtained from different time-frequency resolutions.

FIG. 9 presents an alternate embodiment of the method presented herein. The training data are obtained 901. A first STFT transform with window length $L_1$ is applied 902 to provide the magnitude spectrogram $X_1$. A second STFT transform with window length $L_2$ is applied 903 on the same training data to provide the magnitude spectrogram $X_2$. The process is repeated until the final STFT transform with window length $L_P$ is applied 904 to provide the magnitude spectrogram $X_P$. Then an appropriate frequency mapping is performed with a different mapping matrix $B_p$ for each STFT 905, 906, 907 to get the set of spectrograms $V_p$. The spectrograms $V_p$ are combined 908 and an NMF is performed on $\tilde{V}$ 909 to obtain the dictionary $\tilde{W}$ 910. In other embodiments, the training methods presented in FIGS. 8 and 9 can be combined with each other and/or with any other training method, resulting in hybrid training approaches.

Figure 9A:
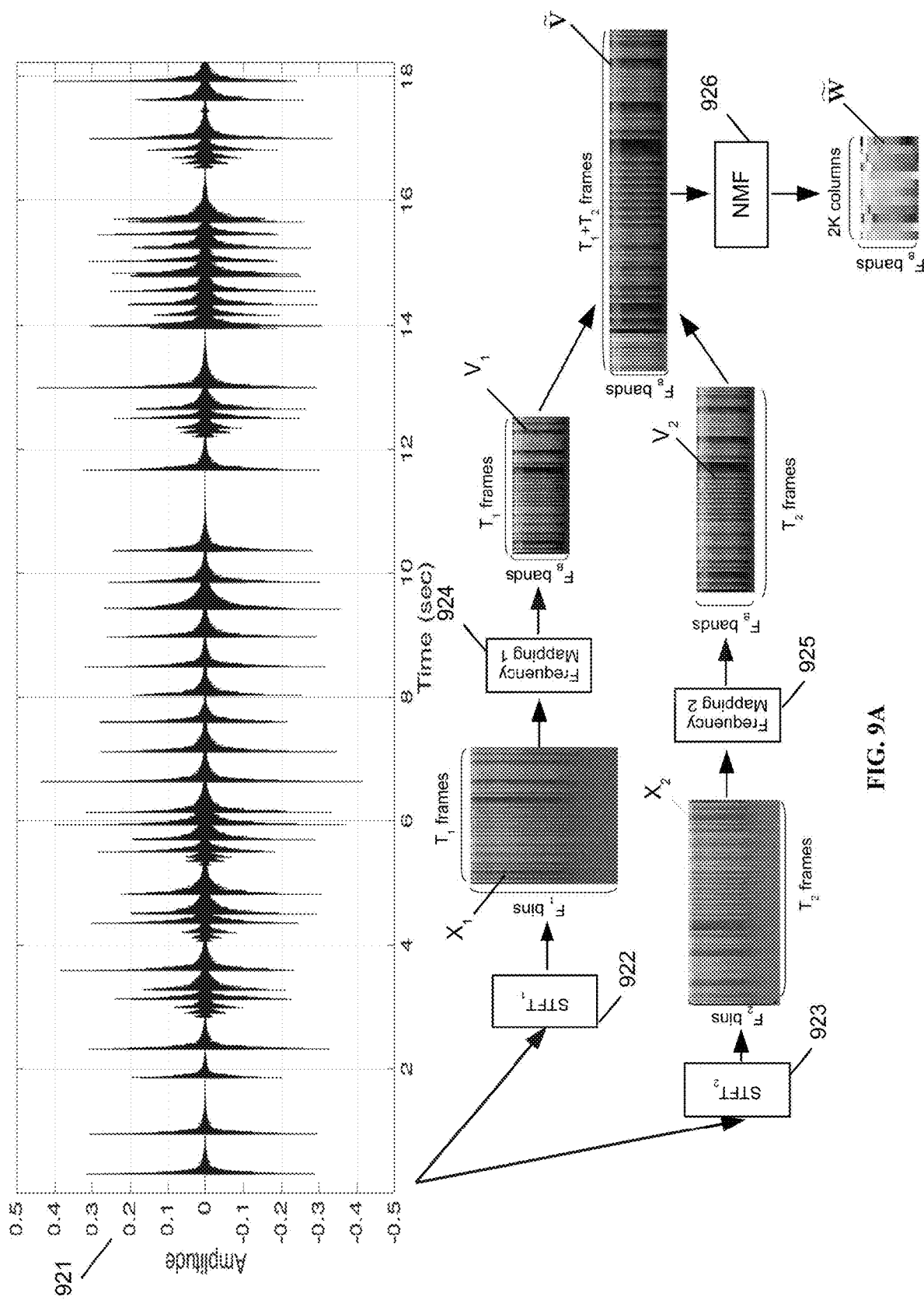
FIG. 9A illustrates an exemplary schematic representation of an embodiment corresponding to the case of P=2.

FIG. 9A shows an exemplary embodiment for the case of P=2. A training signal 921 is captured in the time-domain. A first STFT transform with window length $L_1$ 922 is applied to the signal to produce the first spectrogram $X_1$ with a specific time-frequency resolution. A second STFT transform with window length $L_2$ 923 is applied on the same signal to produce a second spectrogram $X_2$ with a different time-frequency resolution. These spectrograms are mapped 924, 925 by frequency mapping matrices $B_1$ and $B_2$ to a common frequency domain with $F_B$ bands and the spectrograms $V_1$, $V_2$ are produced. $V_1$, $V_2$ are combined to produce $\tilde{V}$ which is a matrix that describes the training data with different time-frequency resolutions. An NMF 926 is applied on $\tilde{V}$ to produce $\tilde{W}$. Matrix $\tilde{W}$ describes the spectral properties of the training data with different time-frequency resolutions.

In other embodiments, the multiple time-frequency resolution training method can be extended for multiple sources and microphones. One assumes a set of training signals $x_m^n(k)$ for n=1, 2, . . . , N sources and m=1, 2, . . . , M microphones are available. Each training signal $x_m^n(k)$ can be a recording of the n-th source in the m-th microphone without any other sources being active or present. A set of magnitude spectrograms $X_m^{n,p}$ in some domain $\delta$, can be obtained similarly to (2). Each spectrogram $X_m^{n,p}$ is a result of a different time-frequency transformation with p=1, 2, . . . , P and P the number of total transformations. $X_m^{n,p}$ represents the training data for the n-th source in the m-th microphone as described by the p-th time-frequency resolution. One can also construct a set of frequency mapping matrices $B_p$. One can then have a set of spectrograms $V_m^{n,p} \in \mathbb{R}_+^{F_B \times T_p}$. Similarly to (18) the set of spectrograms $V_m^{n,p}$ represent the training data for the n-th source as captured by the m-th microphone and the p-th time-frequency resolution in the common time-frequency domain after the mapping provided by the mapping matrix $B_p$. One can combine the spectrograms $V_m^{n,p}$ for the n-th source as:

$$\overline{V}^{n,p}=[(V_1^{n,p})^T (V_2^{n,p})^T \ldots (V_M^{n,p})^T]^T \quad (22)$$

The matrix $\overline{V}^{n,p} \in \mathbb{R}_+^{MF_B \times T_p}$ describes the training data for the n-th source with the p-th time-frequency resolution as captured by all microphones. In one embodiment, one can perform one NMF per matrix $\overline{V}^{n,p}$ and obtain a set of matrices $\overline{W}^{n,p} \in \mathbb{R}_+^{MF_B \times K_n}$ which can then be combined as:

$$\tilde{W}^n=[\overline{W}^{n,1} \overline{W}^{n,2} \ldots \overline{W}^{n,P}] \quad (23)$$

where $\tilde{W}^n \in \mathbb{R}_+^{MF_B \times PK_n}$. Note that in other embodiments, any appropriate method can be used to extract $\overline{W}^{n,p}$ from $\overline{V}^{n,p}$ and all are within the scope of the present disclosure. The matrix $\overline{W}^{n,p}$ is a set of $K_n$ basis functions that model the n-th source with the p-th time-frequency resolution in the common frequency domain provided by the mapping matrix $B_p$. The matrix $\tilde{W}^n$ combines all of the basis functions for all time-frequency resolutions and microphones. $\tilde{W}^n$ is a global model of the n-th source.

In another embodiment one can combine the spectrograms $\overline{V}^{n,p}$ to one another as follows:

$$\tilde{V}^n=[\overline{V}^{n,1} \overline{V}^{n,2} \ldots \overline{V}^{n,P}] \quad (24)$$

where $\tilde{V}^n \in \mathbb{R}_+^{MF_B \times T'}$ and $T'=\Sigma_p T_p$. The matrix $\tilde{V}^n$ describes the training data of the n-th source as captured by all microphones for all available time-frequency resolutions in the common time-frequency domain provided by the mapping matrix Bp. Applying NMF on $\tilde{V}^n$ can provide a variant version of $\tilde{W}^n$ in (23).

Whether $\tilde{W}^n$ is calculated from the NMF of $\tilde{V}^n$ or the combination of $\overline{W}^{n,p}$ from individual NMFs on $\overline{V}^{n,p}$ it has the same interpretation. $\tilde{W}^n$ is an expanded version of $\overline{W}^n$ described in (14). While $\overline{W}^n$ contains basis functions that model the n-th source in all microphones, it is limited to a specific time-frequency resolution and models only a subset of the source properties. $\tilde{W}^n$ combines basis functions and models the n-th source using different time-frequency resolutions and hence provides a more complete model of the source.

Note that the steps 833, 834, 835, 836, 837, 838, 839, 840, 841 and 842 in FIG. 8B can be logically expanded to accommodate the use of $\tilde{W}^n$ described above. That is, while not shown in FIG. 8B, $\tilde{W}''$ can be used to separate sources when both multi-sensor and multi-resolution audio data is available.

In another embodiment, the same principle of using multiple time-frequency resolutions simultaneously to extract feature vectors that will improve the training and performance of machine learning algorithms can be used. Consider a time-domain signal x(k) that will be used as an input to a machine learning algorithm. The first step of using any machine learning method is to extract a set of features that describe this signal. These features are typically arranged in a vector form. In the case of audio signals, such features are commonly extracted in the time-frequency domain. Therefore, in another embodiment, multiple time-frequency resolutions are used in order to extract a set of features for each time frequency resolution and combined into an extended feature vector.

Aspects of the technology this at least relate to:

A method for improving the separation of audio sources comprising:

obtaining first data from a training source signal in a sensor;

transforming the first data to the time-frequency domain using a first window length and obtaining a first representation;

transforming the first data to the time-frequency domain using a second window length and obtaining a second representation;

determining elements of a training dictionary using one or more signal processing algorithms from the first and second representations;

wherein the first and second window lengths are different;

storing the training dictionary elements;

using the training dictionary elements to process second data obtained by the sensor; and audibly outputting a signal related to the processed second data.

Any one or more of the above aspects, wherein the first and second representation are mapped to a time-frequency domain with common frequency resolution before determining the training dictionary elements.

Any one or more of the above aspects, where the source signal is single channel or binaural or multichannel audio signal.

Any one or more of the above aspects, where the signal processing algorithms are one or more of non-negative matrix factorization, non-negative tensor factorization, independent component analysis, principal component analysis, singular value decomposition, dependent component analysis, low-complexity coding and decoding, stationary subspace analysis, common spatial pattern, empirical mode decomposition, tensor decomposition, canonical polyadic decomposition, higher-order singular value decomposition, and tucker decomposition.

Any one or more of the above aspects, where the training dictionary is used for source separation.

Any one or more of the above aspects, where the representations can be obtained with any one or more of a short-time Fourier transform (STFT), a wavelet transform, a polyphase filterbank, a multi rate filterbank, a quadrature mirror filterbank, a warped filterbank, an auditory-inspired filterbank, a tree-structured array of filterbanks, etc.

Any one or more of the above aspects, where the data are captured in live or studio music events from one or more microphones.

A method for improving the separation of audio sources comprising:

capturing one or more sound sources from two or more microphones and creating a first set of two or more time-domain signals;

storing the first set of time-domain signals;

removing silence from the first set of time domain signals;

transforming the first set of time domain signals via a time-frequency transform and creating two or more representations;

stacking the representations and creating a new representation;

extracting training dictionary elements using one or more signal processing algorithms from the new representation;

storing the training dictionary elements;

using the training dictionary elements to process a second set of two or more time-domain signals obtained by the two or more microphones; and audibly outputting the processed second set of time domain signals.

Any one or more of the above aspects, where the time-domain signals are single channel or binaural or multichannel audio signals.

Any one or more of the above aspects, where the signal processing algorithms are one or more of non-negative matrix factorization, non-negative tensor factorization, independent component analysis, principal component analysis, singular value decomposition, dependent component analysis, low-complexity coding and decoding, stationary subspace analysis, common spatial pattern, empirical mode decomposition, tensor decomposition, canonical polyadic decomposition, higher-order singular value decomposition, and tucker decomposition.

Any one or more of the above aspects, where the training dictionary is used for source separation Any one or more of the above aspects, where sound sources are captured in live or studio music events.

A system that improves the separation of audio sources comprising:

two or more microphones that capture one or more sound sources a transform that creates a first set of two or more time-domain signals;

memory adapted to store the first set of time-domain signals;

a processor adapted to remove silence from the first set of time domain signals;

a transformer that transforms the first set of time domain signals via a time-frequency transform and creates two or more representations;

one or more signal processing algorithms that stack the representations, create a new representation and extract training dictionary elements from the new representation;

storage that stores the training dictionary elements;

the training dictionary elements used to process a second set of two or more time-domain signals obtained by the two or more microphones; and at least one speaker that audibly outputs the processed second set of time domain signals.

Any one or more of the above aspects, where the time-domain signals are single channel or binaural or multichannel audio signals.

Any one or more of the above aspects, where the signal processing algorithms are one or more of non-negative matrix factorization, non-negative tensor factorization, independent component analysis, principal component analysis, singular value decomposition, dependent component analysis, low-complexity coding and decoding, stationary subspace analysis, common spatial pattern, empirical mode decomposition, tensor decomposition, canonical polyadic decomposition, higher-order singular value decomposition, and tucker decomposition.

Any one or more of the above aspects, where the training dictionary is used for source separation Any one or more of the above aspects, where sound sources are captured in live or studio music events.

A system for improving the separation of audio sources comprising:

means for obtaining first data from a training source signal in a sensor;

means for transforming the first data to the time-frequency domain using a first window length and obtaining a first representation;

means for transforming the first data to the time-frequency domain using a second window length and obtaining a second representation;

means for determining elements of a training dictionary using one or more signal processing algorithms from the first and second representations, wherein the first and second window lengths are different;

means for storing the training dictionary elements;

means for using the training dictionary elements to process second data obtained by the sensor; and means for audibly outputting a signal related to the processed second data.

One or more means to implement any one or more of the above aspects.

A non-transitory computer-readable information storage media having stored thereon instructions, that when executed by one or more controllers/processors, cause to be performed the method in any one or more of the above aspects.

While the above-described flowcharts have been discussed in relation to a particular sequence of events, it should be appreciated that changes to this sequence can occur without materially effecting the operation of the invention. Additionally, the exemplary techniques illustrated herein are not limited to the specifically illustrated embodiments but can also be utilized and combined with the other exemplary embodiments and each described feature is individually and separately claimable.

While the above described embodiments and flowcharts have focused on an exemplary application involving audio signals, and hence often use terms such as sound source and microphone, it is to be understood that the methods are applicable to processing data originating from any communications source as well, including any wired or wireless signal. It is also meant to be understood that the sensor can be any device that can receive or perceive the source signal, such as a communications receiver, a modem or the like. Thus the methods described above also apply in multi-user or multi-transceiver communications systems where multiple data signals (which may include reference or training data which is typically known, as well as user data which is typically meant to be communicated as information) are exchanged between transmitters and receivers and where (i) the communications paths between each transmitter-receiver pairs are taken into consideration and considered in a multi-user or multi-transceiver environment and (ii) different time frequency resolutions can be utilized on data signals communicated between each transmitter-receiver pair to capture different spectral characteristics of the data signal.

In such communications systems, the training signals could be reference signals or signals transmitted and/or received during an initialization phase, and the non-training signals can be steady state or other signals transmitted/received during information exchange between transceiver devices. The multiple transmitters are the sources, the multiple receivers are the sensors. Machine learning algorithms would take advantage or the multi-sensor, multi-channel nature of such a multi-user communications system to improve multi-user performance (also known as multiple input multiple output MIMO systems) in the presence of noise and crosstalk (i.e., the disruption caused between users) using techniques similar to the ones described above (for multi-sensors) and below (for multi-resolution). In this case, the W matrices (stored dictionary matrix 20 in FIG. 10) represent the spectral properties of each transmitter (as received in each receiver and at one or more time-frequency resolutions) and the output signals $y_n$ (60, 61 and 63 in FIG. 11) are communications signals each representing aspects of estimates of individually transmitted (i.e. separated) signal $x_m$.

Additionally, the systems, methods and protocols of this invention can be implemented on a special purpose computer, a programmed micro-processor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed methods may be readily implemented in software on an embedded processor, a micro-processor or a digital signal processor. The implementation may utilize either fixed-point or floating point operations or both. In the case of fixed point operations, approximations may be used for certain mathematical operations such as logarithms, exponentials, etc. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems and methods illustrated herein can be readily implemented in hardware and/or software using any known or later developed systems or structures, devices and/or software by those of ordinary skill in the applicable art from the functional description provided herein and with a general basic knowledge of the audio processing arts.

Moreover, the disclosed methods may be readily implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated system or system component, or the like. The system can also be implemented by physically incorporating the system and/or method into a software and/or hardware system, such as the hardware and software systems of an electronic device.

It is therefore apparent that there has been provided, in accordance with the present invention, systems and methods for data training in multi-sensor setups. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method for improving the separation of audio sources comprising:
    obtaining from a sensor a first time series of N audio signal samples s1, s2, . . . , sN corresponding to a known training signal;
    transforming the time series of N samples to a first spectrogram in the time-frequency domain using a first window length and obtaining a time-frequency representation with a first resolution; wherein the first spectrogram comprises a first number of frequency bins and a first number of time frames;
    transforming the same time series of N samples s1, s2, . . . , sN to a second spectrogram in the time-frequency domain using a second window length, different from the first window length, and obtaining a time-frequency representation with a second resolution, different from the first resolution; wherein the second spectrogram comprises a second number of frequency bins and a second number of time frames, different from the first number of time frames;
    mapping the first spectrogram to a third spectrogram through a matrix multiplication such that the third spectrogram comprises a third number of frequency bins and a third number of time frames, equal to the first number of time frames;
    mapping the second spectrogram to a fourth spectrogram through a matrix multiplication such that the fourth spectrogram comprises the same third number of frequency bins and a fourth number of time frames, equal to the second number of time frames;
    wherein the third number of frequency bins is different than the first number of frequency bins and the third number of frequency bins is different than the second number of frequency bins;
    determining elements of a training dictionary from the third and fourth spectrograms using one or more signal processing algorithms;
    storing the training dictionary elements;
    using the training dictionary elements to process a second time series of audio signal samples obtained by the sensor; and
    audibly outputting an audio signal related to the processed second series of audio signal samples.

2. The method of claim 1, wherein the first and second number of frequency bins are different.

3. The method of claim 1, where the source signal is single channel or binaural or multichannel audio signal.

4. The method of claim 1, where the signal processing algorithms are one or more of non-negative matrix factorization, non-negative tensor factorization, independent component analysis, principal component analysis, singular value decomposition, dependent component analysis, low-complexity coding and decoding, stationary subspace analysis, common spatial pattern, empirical mode decomposition, tensor decomposition, canonical polyadic decomposition, higher-order singular value decomposition, and tucker decomposition.

5. The method of claim 1, where the training dictionary is used for source separation.

6. The method of claim 1, where the representations can be obtained with any one or more of a short-time Fourier transform (STFT), a wavelet transform, a polyphase filterbank, a multi rate filterbank, a quadrature mirror filterbank, a warped filterbank, an auditory-inspired filterbank, and a tree-structured array of filterbanks.

7. The method of claim 1, wherein the data are captured in live or studio music events from one or more microphones.

8. The method of claim 1, wherein the frequency bins in the third and fourth spectrogram are non-uniform.

9. A system for improving the separation of audio signals comprising:
    a sensor that obtains a first time series of N audio signal samples s1, s2, . . . , sN corresponding to a known training signal;
    a first transformer that transforms the time series of N samples to a first spectrogram in the time-frequency domain using a first window length to obtain a time-frequency representation with a first resolution;
    wherein the first spectrogram comprises a first number of frequency bins and a first number of time frames;
    a second transformer that transforms the same time series of N samples s1, s2, . . . , sN to a second spectrogram in the time-frequency domain using a second window length, different from the first window length, to obtain a time-frequency representation with a second resolution, different from the first resolution;
    wherein the second spectrogram comprises a second number of frequency bins and a second number of time frames, different from the first number of time frames;
    a processor that maps the first spectrogram to a third spectrogram through a matrix multiplication such that the third spectrogram comprises a third number of frequency bins and a third number of time frames, equal to the first number of time frames;
    said processor further maps the second spectrogram to a fourth spectrogram through a matrix multiplication such that the fourth spectrogram comprises the same third number of frequency bins and a fourth number of time frames, equal to the second number of time frames;
    wherein the third number of frequency bins is different than the first number of frequency bins and the third number of frequency bins is different than the second number of frequency bins;
    said processor further determines elements of a training dictionary from the third and fourth spectrograms using one or more signal processing algorithms;
    a storage for storing the training dictionary elements;
    said processor further using the training dictionary elements to process a second time series of audio signal samples obtained by the sensor;
    and audibly outputting an audio signal related to the processed second series of audio signal samples.

10. The system of claim 9, wherein the first and second number of frequency bins are different.

11. The system of claim 9, wherein the third number of frequency bins are non-uniform.

12. The system of claim 9, wherein the source signal is a single channel or binaural or multichannel audio signal.

13. The system of claim 9, wherein the signal processing algorithms are one or more of non-negative matrix factorization, non-negative tensor factorization, independent component analysis, principal component analysis, singular value decomposition, dependent component analysis, low-complexity coding and decoding, stationary subspace analysis, common spatial pattern, empirical mode decomposition, tensor decomposition, canonical polyadic decomposition, higher-order singular value decomposition, and tucker decomposition.

14. The system of claim 9, wherein the training dictionary is used for source separation.

15. The system of claim 9, wherein a time-frequency representation can be obtained with any one or more of a short-time Fourier transform (STFT), a wavelet transform, a polyphase filterbank, a multi rate filterbank, a quadrature mirror filterbank, a warped filterbank, an auditory-inspired filterbank, and a tree-structured array of filterbanks.

16. The system of claim 9, wherein the frequency bins in the third and fourth spectrogram are non-uniform.

17. A non-transitory information storage media having stored thereon information, that when executed by one or more processors, cause to be performed a method for improving the separation of audio signals comprising:

obtaining from a sensor a first time series of N audio signal samples s1, s2, . . . , sN corresponding to a known training signal;

transforming the time series of N samples to a first spectrogram in the time-frequency domain using a first window length and obtaining a time-frequency representation with a first resolution;

wherein the first spectrogram comprises a first number of frequency bins and a first number of time frames;

transforming the same time series of N samples s1, s2, . . . , sN to a second spectrogram in the time-frequency domain using a second window length, different from the first window length, and obtaining a time-frequency representation with a second resolution, different from the first resolution;

wherein the second spectrogram comprises a second number of frequency bins and a second number of time frames, different from the first number of time frames;

mapping the first spectrogram to a third spectrogram through a matrix multiplication such that the third spectrogram comprises a third number of frequency bins and a third number of time frames, equal to the first number of time frames;

mapping the second spectrogram to a fourth spectrogram through a matrix multiplication such that the fourth spectrogram comprises the same third number of frequency bins and a fourth number of time frames, equal to the second number of time frames;

wherein the third number of frequency bins is different than the first number of frequency bins and the third number of frequency bins is different than the second number of frequency bins;

determining elements of a training dictionary from the third and fourth spectrograms using one or more signal processing algorithms;

storing the training dictionary elements;

using the training dictionary elements to process a second time series of audio signal samples obtained by the sensor;

and audibly outputting an audio signal related to the processed second series of audio signal samples.

18. The media of claim 17, wherein the first and second number of frequency bins are different.

19. The media of claim 17, wherein the third number of frequency bins are non-uniform.

20. The media of claim 17, wherein the source signal is a single channel or binaural or multichannel audio signal.

21. The media of claim 17, wherein the signal processing algorithms are one or more of non-negative matrix factorization, non-negative tensor factorization, independent component analysis, principal component analysis, singular value decomposition, dependent component analysis, low-complexity coding and decoding, stationary subspace analysis, common spatial pattern, empirical mode decomposition, tensor decomposition, canonical polyadic decomposition, higher-order singular value decomposition, and tucker decomposition.

22. The media of claim 17, wherein the training dictionary is used for source separation.

23. The media of claim 17, wherein a time-frequency representation can be obtained with any one or more of a short-time Fourier transform (STFT), a wavelet transform, a polyphase filterbank, a multi rate filterbank, a quadrature mirror filterbank, a warped filterbank, an auditory-inspired filterbank, and a tree-structured array of filterbanks.

24. The media of claim 17, wherein the frequency bins in the third and fourth spectrogram are non-uniform.

* * * * *